(12) United States Patent
Wissmann et al.

(10) Patent No.: US 11,333,553 B2
(45) Date of Patent: May 17, 2022

(54) METHODS AND APPARATUS FOR SPECIMEN CHARACTERIZATION USING HYPERSPECTRAL IMAGING

(71) Applicant: Siemens Healthcare Diagnostics Inc., Tarrytown, NY (US)

(72) Inventors: Patrick Wissmann, Munich (DE); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 129 days.

(21) Appl. No.: 16/632,323

(22) PCT Filed: Jul. 16, 2018

(86) PCT No.: PCT/US2018/042344
§ 371 (c)(1),
(2) Date: Jan. 17, 2020

(87) PCT Pub. No.: WO2019/018314
PCT Pub. Date: Jan. 24, 2019

(65) Prior Publication Data
US 2020/0166405 A1    May 28, 2020

Related U.S. Application Data

(60) Provisional application No. 62/534,648, filed on Jul. 19, 2017.

(51) Int. Cl.
*G01J 3/28* (2006.01)
*G01N 21/359* (2014.01)
*G06T 7/00* (2017.01)

(52) U.S. Cl.
CPC .......... *G01J 3/2823* (2013.01); *G01N 21/359* (2013.01); *G06T 7/0012* (2013.01); *G01J 2003/2826* (2013.01)

(58) Field of Classification Search
CPC .... G01J 3/28; G01J 3/02; G01J 3/2823; G01J 2003/2826; G01J 3/0208; G01N 21/359;
(Continued)

(56) References Cited

U.S. PATENT DOCUMENTS 6,353,471 B1    3/2002   Samsoondar et al.
6,866,823 B2    3/2005   Wardlaw
(Continued)

FOREIGN PATENT DOCUMENTS

EP    1186893 B1   1/2008
EP    1967840 A2   9/2008
(Continued)

OTHER PUBLICATIONS

Extended EP Search Report dated Jul. 10, 2020 of corresponding European Application No. 18835206.6, 4 Pages.
(Continued)

*Primary Examiner* — Abdullahi Nur

(57) ABSTRACT

An apparatus for characterizing a specimen and/or specimen container. The characterization apparatus includes an imaging location configured to receive a specimen container containing a specimen, a light source configured to provide lighting of the imaging location, and a hyperspectral image capture device. The hyperspectral image capture device is configured to generate and capture a spectrally-resolved image of a small portion of the specimen container and specimen at a spectral image capture device. The spectrally-resolved image data received at the spectral image capture device is processed by a computer to determine at least one of: segmentation of at least one of the specimen and/or specimen container, and determination of a presence or absence of an interferent, such as hemolysis, icterus, or lipemia. Methods of imaging a specimen and/or specimen (Continued)

container, and specimen testing apparatus including a characterization apparatus are described, as are other aspects.

23 Claims, 11 Drawing Sheets

(58) Field of Classification Search
CPC . G01N 2035/00821; G01N 2035/0493; G01N 35/00732; G01N 35/04; G01N 2201/0627; G01N 2201/0634; G01N 2201/0806; G01N 21/31; G01N 15/05; G06T 7/0012
See application file for complete search history.

(56) References Cited

U.S. PATENT DOCUMENTS

| | | | |
|---|---|---|---|
| 7,422,693 B2 | 9/2008 | Carter et al. | |
| 7,652,765 B1 | 1/2010 | Geshsind et al. | |
| 7,663,738 B2 | 2/2010 | Johansson | |
| 7,771,659 B2 | 8/2010 | Ziegler | |
| 8,064,061 B2 | 11/2011 | Yamamoto et al. | |
| 8,194,235 B2 | 6/2012 | Kosaka et al. | |
| 8,310,658 B2 | 11/2012 | Wardlaw et al. | |
| 8,380,444 B2 | 2/2013 | Kim et al. | |
| 8,381,581 B2 | 2/2013 | Walsh et al. | |
| 8,634,607 B2 * | 1/2014 | Levenson | G01J 3/453 382/128 |
| 8,859,289 B2 | 10/2014 | Marty et al. | |
| 9,017,610 B2 | 4/2015 | Winkelman et al. | |
| 9,322,761 B2 | 4/2016 | Miller | |
| 10,746,665 B2 | 8/2020 | Kluckner et al. | |
| 10,746,753 B2 | 8/2020 | Kluckner et al. | |
| 10,816,538 B2 | 10/2020 | Kluckner et al. | |
| 10,928,310 B2 | 2/2021 | Wissmann et al. | |
| 11,042,788 B2 | 6/2021 | Kluckner et al. | |
| 11,073,472 B2 | 7/2021 | Wissmann et al. | |
| 2001/0004285 A1 | 6/2001 | Cadell et al. | |
| 2002/0001110 A1 | 1/2002 | Metz et al. | |
| 2003/0035751 A1 | 2/2003 | Hanley et al. | |
| 2003/0193589 A1 | 10/2003 | Lareau et al. | |
| 2005/0243312 A1 | 11/2005 | Geshwind et al. | |
| 2009/0171591 A1 | 7/2009 | Timmis et al. | |
| 2011/0144505 A1 | 6/2011 | Yamamoto et al. | |
| 2011/0267450 A1 | 11/2011 | Pronkine | |
| 2012/0140230 A1 | 6/2012 | Miller | |
| 2013/0012794 A1 | 1/2013 | Zeng et al. | |
| 2013/0076882 A1 | 3/2013 | Itoh | |
| 2014/0161330 A1 | 6/2014 | Allano et al. | |
| 2014/0293036 A1 | 10/2014 | Ddecaux et al. | |
| 2014/0369030 A1 | 12/2014 | Livesay et al. | |
| 2015/0044098 A1 | 2/2015 | Smart et al. | |
| 2016/0007858 A1 | 1/2016 | Hendriks et al. | |
| 2016/0042513 A1 | 2/2016 | Yudovsky | |

FOREIGN PATENT DOCUMENTS

| | | |
|---|---|---|
| JP | H07-280814 A | 10/1995 |
| JP | 2000-500578 A | 1/2000 |
| JP | 2003-502631 A | 1/2003 |
| JP | 2010-276552 A | 12/2010 |
| JP | 2013-501937 A | 1/2013 |
| JP | 2013-521900 A | 6/2013 |
| JP | 2015-219122 A | 12/2015 |
| JP | 2017-506342 A | 3/2017 |
| JP | 2017-110931 A | 6/2017 |
| WO | 0036400 A1 | 6/2000 |
| WO | 2012/060353 A1 | 5/2012 |
| WO | 2016/133900 A1 | 8/2016 |
| WO | 2017/132166 A1 | 8/2017 |
| WO | 2017/132171 A1 | 8/2017 |
| WO | 2018/191295 A1 | 10/2018 |
| WO | 2019/018313 A1 | 1/2019 |

OTHER PUBLICATIONS

PCT International Search Report and Written Opinion dated Oct. 2, 2018 (12 Pages).

* cited by examiner

METHODS AND APPARATUS FOR SPECIMEN CHARACTERIZATION USING HYPERSPECTRAL IMAGING

CROSS-REFERENCE TO RELATED APPLICATIONS

This application claims priority to U.S. provisional application Ser. No. 62/534,648 filed on Jul. 19, 2017, the contents of which is incorporated herein by reference in its entirety.

FIELD

The present disclosure is directed to methods and apparatus for characterizing a biological specimen, and, more particularly to methods and apparatus for determining the presence of an interferent in the biological specimen and/or segmenting the biological specimen.

BACKGROUND

Automated testing systems may conduct clinical chemistry or assays using one or more reagents to identify an analyte or other constituent in a biological specimen such as blood serum, blood plasma, and the like. For convenience and safety reasons, these specimens may be contained in specimen containers (e.g., blood collection tubes).

Improvements in automated testing technology have been accompanied by corresponding advances in pre-analytical sample preparation and handling operations such as batch preparation, centrifugation of the biological specimen to separate specimen constituents, cap removal to facilitate specimen access, automated aliquoting, and the like by automated pre-analytical specimen preparation systems, which may be part of a Laboratory Automation System (LAS). The LAS may automatically transport specimens contained in the specimen containers, and received on carriers, to a number of pre-analytical specimen processing stations recited above, as well as to analytical stations containing clinical chemistry analyzers and/or assay instruments (collectively referred to as "analyzers" herein).

LASs may handle all different sizes and types of specimen containers, which may contain barcode labels. The barcode label may contain an accession number that may be correlated to demographic information that may be entered into a hospital's Laboratory Information System (LIS) along with test orders and other information. An operator or robot may place the barcode-labeled specimen containers onto the LAS system, and the LAS system may automatically transport the specimen containers for such pre-analytical operations, all prior to the specimen actually being subjected to clinical analysis or assaying by the one or more analyzers.

For certain tests, an amount of a serum or plasma portion of the specimen obtained from whole blood by fractionation (e.g., centrifugation) may be aspirated and used. In some instances, a gel separator may be added to the specimen container to aid in physically separating a settled blood portion from the serum or plasma portion. In some embodiments, after fractionation and a subsequent de-capping process, the specimen container may be transported to an appropriate analyzer on the LAS that may extract via aspiration with a pipette, serum or plasma portion from the specimen container and combine the serum or plasma portion with one or more reagents, diluents, and possibly other substances in a reaction vessel (e.g., cuvette). Analytical measurements may then be performed, often using a beam of interrogating radiation, for example, or by using photometric or fluorometric absorption readings, or the like. The measurements allow for the determination of end-point or rate or other values, from which the concentration of analyte or other constituent may be determined using well-known techniques.

In some specimen testing apparatus, the specimen containers may be of different size and also the total amount of specimen contained therein as well as the relative amounts of settled blood portion and serum or plasma portion may vary substantially from specimen container to specimen container. This may lead to uncertainly in terms of robot and pipette movement and positioning.

Furthermore, the presence of one or more interferent in the specimen as a result of sample processing or patient disease condition may possibly adversely affect the accuracy of the test results of the analyte or constituent measurement obtained from the one or more analyzers. For example, the presence of hemolysis (hereinafter "H"), icterus (hereinafter "I"), and/or lipemia (hereinafter "L") which are collectively H, I, and/or L (hereinafter referred to as "HIL") may affect specimen testing results. However, determining HIL may be very computationally intensive.

Because of problems encountered when different-sized specimen containers are used in the LAS, the need to know the location of and/or amounts of serum or plasma present, as well as the need to pre-screen for HIL in the specimen to be analyzed, there is an unmet need for a computationally-efficient method and apparatus adapted to readily and automatically image and analyze such specimens.

SUMMARY

According to a first aspect, a characterization apparatus is provided. The characterization apparatus including an imaging location configured to receive a specimen container containing a specimen; a light source configured to provide lighting of the imaging location; a hyperspectral image capture device comprising a spectral image capture device, the hyperspectral image capture device configured to generate and capture a spectrally-resolved image of a portion of the specimen container and specimen at the spectral image capture device; and a computer configured and operable to process the spectrally-resolved image received at the spectral image capture device and determine at least one of: segmentation of at least one of: segmentation of the specimen, segmentation of the specimen container and the specimen, and a presence or absence of an interferent.

In another aspect, a specimen testing apparatus is provided. The specimen testing apparatus includes a track; a carrier moveable on the track and configured to support a specimen container containing a specimen; and a characterization apparatus located on the track, the characterization apparatus comprising: an imaging location configured to receive the specimen container containing the specimen carried by the carrier, a light source configured to provide lighting of the imaging location, a hyperspectral image capture device including a spectral image capture device configured to generate and capture a spectrally-resolved image of a portion of the specimen container and specimen at the imaging location, and a computer configured and operable to process the spectrally-resolved image received at the spectral image capture device and determine at least one of: segmentation of the specimen, segmentation of the specimen container and the specimen, and a presence or absence of an interferent.

According to another aspect, a method of characterizing a specimen container and/or a specimen is provided. The method includes providing the specimen container containing the specimen at an imaging location; providing a hyperspectral image capture device configured to capture an image at the imaging location; providing one or more light sources configured to provide illumination of the imaging location; illuminating the imaging location with the one or more light sources; capturing the spectrally-resolved image of a portion of the specimen container and specimen with the hyperspectral image capture device; and processing the spectrally-resolved image to determine at least one of: segmentation of the specimen, segmentation of the specimen container and the specimen, and a presence or absence of an interferent.

Still other aspects, features, and advantages of the present disclosure may be readily apparent from the following description by illustrating a number of example embodiments, including the best mode contemplated for carrying out the present invention. The present disclosure may also be capable of other and different embodiments, and its details may be modified in various respects, all without departing from the scope of the present disclosure. Accordingly, the drawings and descriptions are to be regarded as illustrative in nature, and not as restrictive. The disclosure is to cover all modifications, equivalents, and alternatives falling within the scope of the appended claims.

BRIEF DESCRIPTION OF THE DRAWINGS

The drawings, described below, are for illustrative purposes only and are not necessarily drawn to scale. The drawings are not intended to limit the scope of the disclosure in any way.

DETAILED DESCRIPTION

Figure 1:
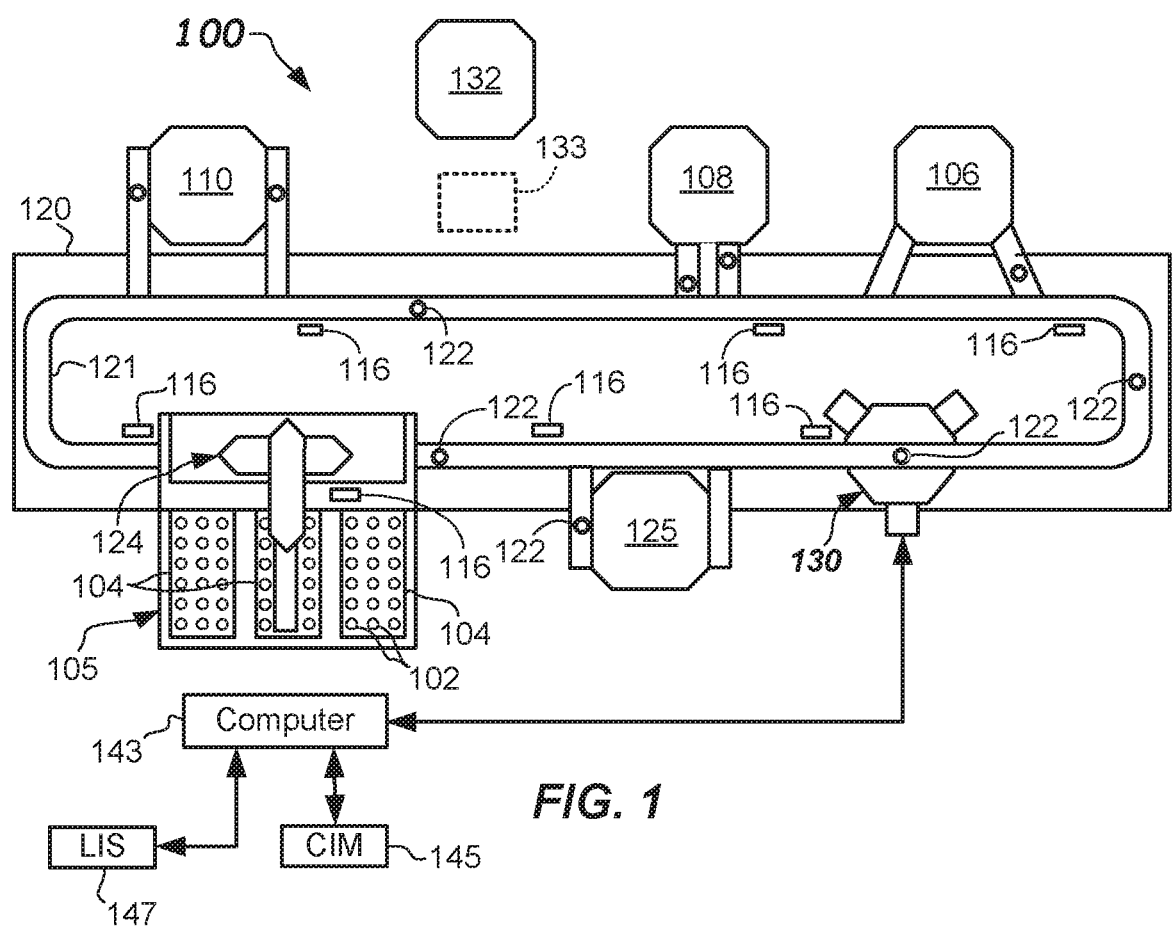
FIG. 1 illustrates a top schematic diagram of a specimen testing apparatus including a characterization apparatus with hyperspectral imaging according to one or more embodiments.

In a first broad aspect, embodiments of the present disclosure provide methods and apparatus adapted to image and to characterize a specimen contained in a specimen container using hyperspectral imaging. In one or more embodiments, the end result of the characterization method may be the quantification of the specimen contained in the specimen container. For example, the quantification may include characterizing of a location of an upper extent, a lower extent, and even a depth of the serum or plasma portion, and/or the location of an upper extent, lower extent, or even a depth of the settled blood portion of a fractionated blood specimen. These segmented values may be used in later processing. For example, these segmenting values may be used to determine if sufficient amount of the serum or plasma portion is present for the ordered testing, for determining disease state of the patient (e.g., a ratio between the serum or plasma portion and the settled blood portion), and/or for more exact probe tip placement to avoid aspirating air or settled blood portion.

Furthermore, according to one or more embodiments, the present apparats and methods including hyperspectral imaging may be used to determine one or more geometric characteristics of the specimen container. For example, dimensional characteristics of the specimen container may be determined, such as container height, and/or height of a cap. These dimensional characteristics may be used to properly guide the positioning of the probe (otherwise referred to as a "pipette") during a subsequent aspiration process. Such information may be used to avoid contact or crashes of a robot gripper or probe with the specimen container during maneuvers with the robot gripper and/or probe.

In some embodiments, the characterization apparatus and methods including hyperspectral imaging may capture specimen image intensities that may be used for making a determination of a presence of an interferent, such as the presence of hemolysis (H), icterus (I), and/or lipemia (L) in the serum or plasma portion of the specimen or for making a determination that the specimen is normal (N). The present method and apparatus including hyperspectral imaging is computationally effective for each of segmentation and/or interferent detection.

The specimen, as described herein, is collected in a specimen container, such as a blood collection tube, and may include a settled blood portion and a serum and plasma portion after separation (e.g., fractionation using centrifugation). The settled blood portion is made up blood cells such as white blood cells (leukocytes), red blood cells (erythrocytes), and platelets (thrombocytes), which are aggregated and separated from the serum or plasma portion. The settled blood portion is found settled/packed at the bottom part of the specimen container. The serum or plasma portion is the liquid component of blood that is not part of the settled blood portion. It is found above the settled blood portion. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components. In some specimen containers, a gel separator (e.g. a small plug) may be used, which positions itself between the settled blood portion and the serum or plasma portion during fractionation. It serves as a barrier between the two portions and minimizes remixing thereof.

In accordance with one or more embodiments, the characterization methods described herein may be carried out as pre-analytical testing or pre-screening methods. For example, in one or more embodiments, the characterization methods may be carried out prior to the specimen being subjected to analysis (clinical chemistry or assaying) on one or more analyzers. In one or more embodiments, the characterization of the specimen may be determined at one or more characterization apparatus including one or more hyperspectral image capture device. Each of the one or more hyperspectral image capture device is configured to capture one or more spectral images of the specimen container and specimen from a lateral viewpoint. During image capture, the specimen container and specimen may be illuminated. The illumination may be by one or more light panel assemblies. In particular, the illumination may be by provided by back lighting with one or more light panel assembly in some embodiments. In other embodiments, the illumination may be by provided by front lighting with one or more light panel assemblies. The hyperspectral image capture device captures spectral images that are processed to characterize the specimen container and/or specimen, including determining whether an interferent, such as HIL is present in the specimen.

In other embodiments, the methods and apparatus including hyperspectral imaging may be used to identify other characteristics of the specimen container, such as the container type (via identification of height thereof), and may further characterize the cap type, and/or the cap color.

If after characterization by the methods and apparatus described herein, the serum or plasma portion is found to contain one or more of H, I, or L, the specimen may be subjected to further processing. For example, the specimen container containing specimen may be taken to another station (e.g., a remote station) for further processing, or for additional characterization of indexes for, H, I, or L. After such further processing, the specimen may be allowed, in some embodiments, to continue on and undergo routine analysis by the one or more analyzers. In other cases, the specimen may be discarded and redrawn. If the pre-screening finds that the specimen is normal (N), then the specimen may be directly routed to undergo the ordered analysis by the one or more analyzers.

In one or more embodiments, a characterization apparatus is configured to carry out the image capture as part of the LAS where a track transports the specimen to one or more analyzers, and the characterization apparatus may be provided at any suitable location on, or along, the track. For example, characterization apparatus may be located at a loading station, on the track, or elsewhere alongside of the track, so that the specimen and specimen container can be characterized before being received at the one or more analyzers. However, to be clear, the characterization apparatus including hyperspectral imaging may receive the specimen container including specimen other than on a track, and the specimen container including specimen may be loaded and unloaded therefrom either manually or by a robot gripper.

The characterization method may be accomplished in one or more embodiments by using hyperspectral imaging wherein a spatial image of a portion of the specimen and specimen container is optically transformed into a spectral image and received by a spectral image capture device. The transformation from the spatial regime to the spectral regime may be accomplished by an arrangement of lenses, a spectrally-resolving element, such as a prism or grating, and a slit aperture. The slit aperture provides that only a sub-portion of the specimen container is imaged, such as a small central portion of the specimen container width. In some embodiments, the lighting source may be a broad band source. For example, the broad band source may emit a wavelength range from 300 nm to 2000 nm. However, some embodiments, the light source may be a white light source having a wavelength emission range of 400 nm to 750 nm.

The spectral signature received by the spectral image capture device for every vertical incremental portion is processed by a computer. In one embodiment, the processing may provide segmentation information about the specimen and/or specimen container. For example, the segmentation of the specimen may determine a vertical location of one or more of: a serum or plasma portion in the specimen, a settled blood portion of the specimen, a gel separator, air in the specimen container, and a cap. Additionally or optionally, the segmentation of the specimen may determine a vertical location of one or more of: a tube-cap interface, a liquid-air interface, a serum-blood interface, a serum-gel interface, and a blood-gel interface. Moreover, once the vertical serum or plasma portion location is known in the image, a determination of HIL or N can be made for that segment, while ignoring the other segmented regions.

Further details of the characterization methods, characterization apparatus, and specimen testing apparatus including one or more characterization apparatus are further described with reference to FIGS. 1-10 herein.

Figures 2, 3:
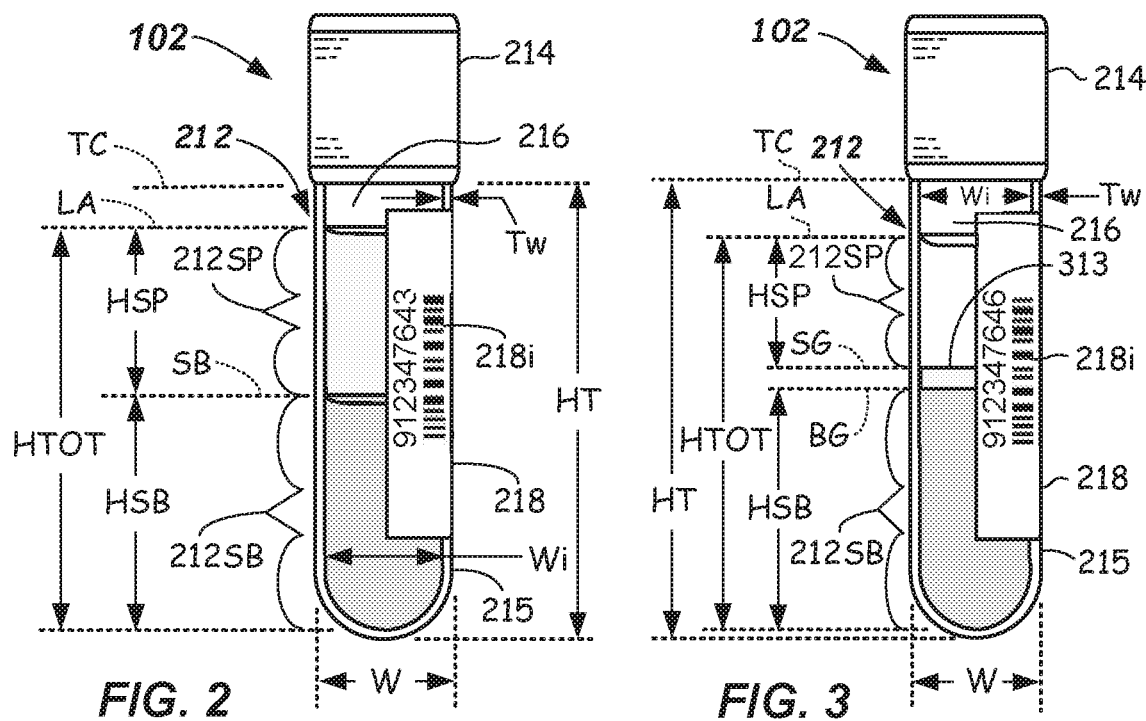
FIG. 2 illustrates a side plan view of a specimen container including a specimen.
FIG. 3 illustrates a side plan view of a specimen container including a specimen and a gel separator.

FIG. 1 shows a specimen testing apparatus 100 capable of automatically processing multiple ones of the specimen containers 102 (e.g., blood collection tubes—see FIGS. 2 and 3). The specimen containers 102 may be contained in one or more racks 104 at a loading area 105 prior to transportation to, and analysis by, one or more analyzers (e.g., first, second, and third analyzer 106, 108, 110, respectively) arranged about the specimen testing apparatus 100. It should be apparent that more or less numbers of analyzers can be used. The analyzers may be any combination of clinical chemistry analyzers and/or assaying instruments, or the like. The specimen containers 102 may be any transparent or translucent container, such as a blood collection tube, test tube, or other clear glass or plastic container configured to contain a specimen 212.

Typically, a specimen 212 (FIGS. 2 and 3) to be imaged may be provided in the specimen containers 102, which may be capped with a cap 214. The caps 214 may have different heights and/or colors (e.g., red, royal blue, light blue, green, grey, tan, or yellow, or combinations of colors), which may have meaning in terms of what test the specimen container 102 is used for, the type of additive that is contained therein, and the like. Other colors may be used. According to one aspect, it may be desirable to image the cap 214 to characterize information about the cap 214 so that it can be used to cross check with test orders to ensure the right specimen container 102 was used for the test that was ordered.

Each of the specimen containers 102 may be provided with identification information 218$i$ (i.e., indicia), such as a barcode, alphabetic, numeric, alphanumeric, or combination thereof that may be machine readable at various locations about the specimen testing apparatus 100. The identification information 218$i$ may indicate, or may otherwise be correlated, via a Laboratory Information System (LIS) 147, to a patient's identification as well as tests to be accomplished upon the specimen 212, or other information, for example. Such identification information 218$i$ may be provided on a label 218 adhered to, or otherwise provided on a lateral side of the specimen container 102. The label 218 may not extend all the way around the specimen container 102, or all along a height of the specimen container 102. In some embodiments, multiple labels 218 may be adhered and may slightly overlap each other. Accordingly, although the label 218 may occlude a view of some portion of the specimen 212, some portion of the specimen 212 may still be viewable from at least one lateral viewpoint.

As best shown in FIGS. 2 and 3, the specimen 212 may include a serum or plasma portion 212SP and a settled blood portion 212SB contained within the tube 215. Air 216 may be provided above the serum and plasma portion 212SP and a line of demarcation between the air 216 and the serum and plasma portion 212SP is defined herein as a liquid-air interface LA. A line of demarcation between the serum or plasma portion 212SP and the settled blood portion 212SB is defined herein as a serum-blood interface SB. An interface between the air 216 and the cap 214 is referred to herein as a tube-cap interface TC. A height of the serum or plasma portion 212SP is HSP and is defined as a height from the top of the serum or plasma portion 212SP to a top of the settled blood portion 212SB, i.e., from LA to SB. A height of the settled blood portion 212SB is HSB and is defined as a height from a bottom of the settled blood portion 212SB to the top of the settled blood portion 212SB at SB. HTOT in FIG. 2 is a total height of the specimen 212 and HTOT=HSP+HSB.

In cases where a gel separator 313 is used (see FIG. 3), a height of the serum or plasma portion 212SP is HSP and is defined as the height from the top of the serum or plasma portion 212SP at LA to a top of the gel separator 313 at SG. The height of the settled blood portion 212SB is HSB and is defined as the height from the bottom of the settled blood portion 212SB to a bottom of the gel separator 313 at BG. HTOT in FIG. 3 is the total height of the specimen 212 and is defined as HTOT=HSP+HSB+height of the gel separator 313. In both cases, a height of the tube HT is defined herein as the height from the bottom-most part of the tube 215 to a bottom of the cap 214.

In more detail, specimen testing apparatus 100 may include a base 120 (e.g., a frame or structure) upon which a track 121 may be mounted or rest. The track 121 may be a railed track (e.g., mono- or multiple-rail track), a collection of conveyor belts, conveyor chains or links, moveable platforms, or any other suitable type of conveyance mechanism. Track 121 may be circular, serpentine, or any other suitable shape and may be a closed track (e.g., endless track) in some embodiments. Track 121 may, in operation, transport individual ones of the specimen containers 102 to destination locations spaced about the track 121 in carriers 122 (a few carriers 122 are labeled).

Carriers 122 may be passive, non-motored pucks that may be configured to carry a single specimen container 102 on the track 121, where the track 121 is moveable. Optionally, carrier 122 may be automated including an onboard drive motor, such as a linear motor that is programmed to move about the track 121 and stop at pre-programmed locations, where the track 121 is stationary. In either case, the carriers 122 may each include a holder 122H (FIG. 4A) configured to hold and support the specimen container 102 in a defined, upright orientation. The holder 122H may include a plurality of fingers, leaf springs, or combinations thereof that secure the specimen container 102 in the carrier 122, but where at least some are laterally moveable or flexible to accommodate for different sizes of specimen containers 102 to be received therein.

In some embodiments, carriers 122 may exit from the loading area 105 having one or more racks 104 staged thereat. In some embodiments, loading area 105 may serve a dual function of allowing offloading of the specimen containers 102 from the carriers 122 after analysis is completed. Otherwise, a suitable offloading lane (not shown) may be provided elsewhere on the track 121.

Figure 4A:
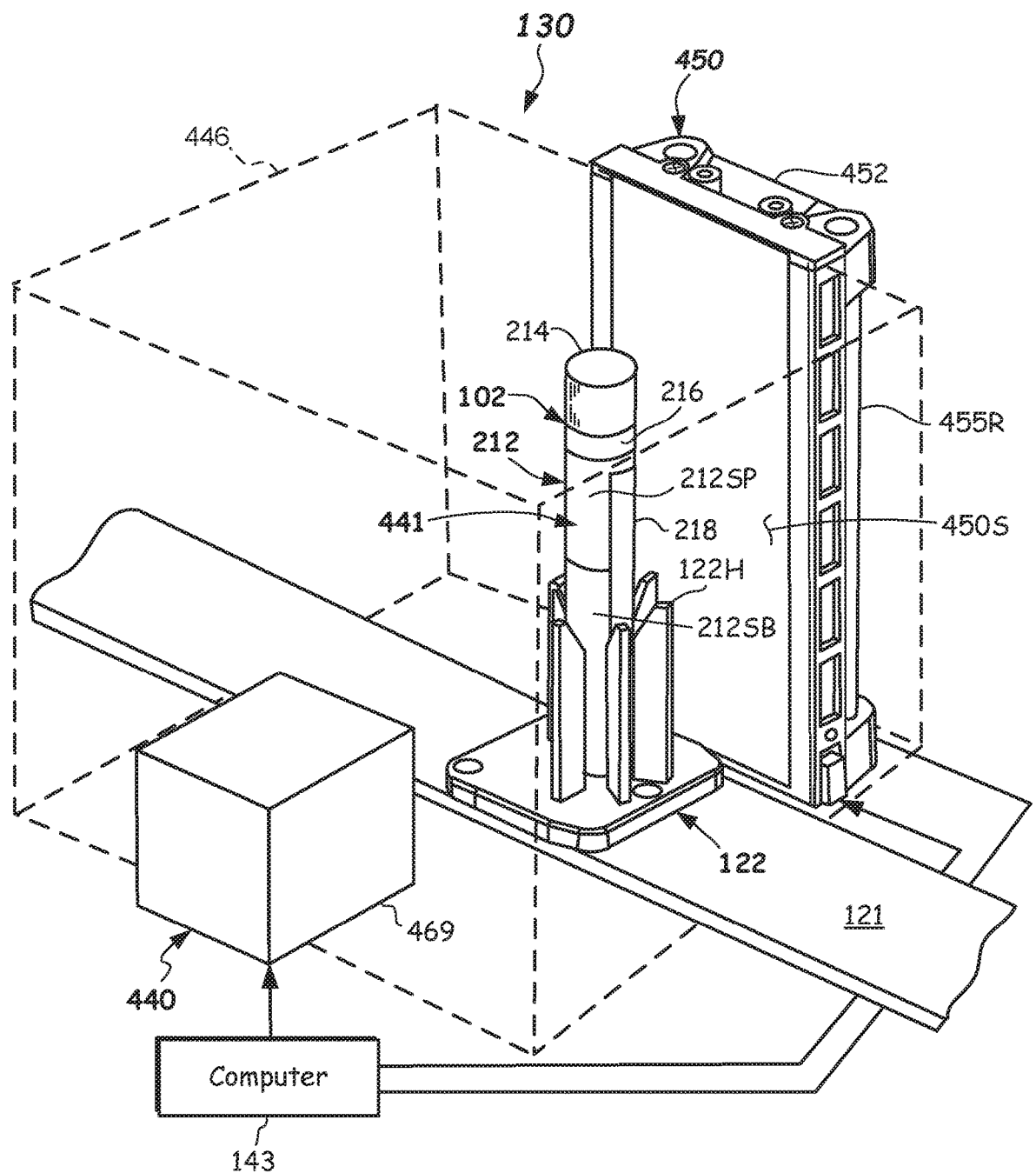
FIG. 4A illustrates an isometric view of a characterization apparatus including hyperspectral transmissive imaging according to embodiments.

Again referring to FIG. 1, a robot 124 may be provided at the loading area 105 and may be configured to grasp the specimen containers 102 from the one or more racks 104 and load the specimen containers 102 onto the carriers 122, such as on an input lane or other location of the track 121. The robot 124 may include one or more (e.g., at least two) robot arms or components capable of X and Z, Y and Z, X, Y, and Z, r and theta, or r, theta, and Z motion. Robot 124 may be a gantry robot, an articulated arm robot, an R-theta robot, or other suitable robot type wherein the robot 124 may be equipped with robotic gripper fingers that may be sized to pick up and place the specimen containers 102. In one or more embodiments, the specimens may be placed in the carrier 122 in a predefined rotational orientation such that the labels 218 are provided on a back side of the specimen container 102, away from the front side that will be imaged (as shown in FIGS. 4A, 4D, and 6) so that the label 218 will not occlude a direct view of the specimen.

To obtain this orientation, the operator may install them in a defined rotational orientation in the rack 104, or the robot 124 may pick up the specimen container 102 and scan the identification information 218$i$ to determine the label location and then place the specimen container in the carrier 122 in the pre-defined orientation based upon knowing the fixed location of the barcode on the label 218. Other means for properly placing the specimen container 102 with label 218 located to the back side may be used.

Upon being loaded onto track 121, the specimen containers 102 carried by carriers 122 may progress to a centrifuge 125 (e.g., a device configured to carry out fractionation of the specimen 212). Carriers 122 carrying specimen containers 102 may be diverted to the centrifuge 125 by inflow lane or a suitable robot (not shown). After being centrifuged, the specimen containers 102 may exit on outflow lane, or otherwise be moved by the robot, and continue on the track 121. In the depicted embodiment, the specimen container 102 in carrier 122 may next be transported to a characterization apparatus 130 to be further described herein.

Characterization apparatus 130 is configured to characterize, through the use of hyperspectral imaging, the specimen 212 contained in the specimen container 102, and may also be adapted to characterize the specimen container 102. Quantification of the specimen 212 may include determination of HSP, HSB, or even HTOT, and may include determination of location of LA, SB and/or SG, and/or BG. The characterization apparatus 130 including hyperspectral imaging may also be configured for determining a presence of an interferent, such as one or more of hemolysis (H), icterus (I), and/or lipemia (L) contained in a specimen 212.

In some embodiments, quantification of one or more physical attributes of the specimen container 102 may take place at the characterization apparatus 130 such as determining HT, TC, or even cap color or cap height. Once the specimen 212 is characterized and has passed predefined pre-screening criteria, the specimen 212 may be forwarded to be analyzed in the one or more analyzers (e.g., first, second, and third analyzers 106, 108, and/or 110).

Additionally, one or more remote stations 132 may be provided on the specimen testing apparatus 100 even though the remote station 132 is not directly linked to the track 121. Remote station 132 may be used to test for certain constituents, such as a hemolysis level, or may be used for further processing, such as to lower a lipemia level through one or more additions, for example. Other testing or processing may be accomplished on remote station 132. For example, another characterization apparatus 130 may be located at the remote station 132. An independent robot 133 (shown dotted) may carry specimen containers 102 containing specimens 212 to the remote station 132 and return them after testing/processing. Optionally, the specimen containers 102 may be manually removed and returned. Furthermore, in some embodiments, additional stations (not shown) may be arranged around the track 121 at various desirable locations, such as additional characterization apparatus 130, a de-capping station, or the like.

The specimen testing apparatus 100 may include sensors 116 at one or more suitable locations around the track 121. Sensors 116 may be used to detect a location of specimen containers 102 along the track 121 by means of reading the identification information 218i (see FIGS. 2 and 3) placed on the specimen container 102, or like information (not shown) provided on each carrier 122 and communicating with computer 143. In some embodiments, a barcode or RFID chip may be provided on the carrier 122 to aid in the tracking operation, for example. Other means for tracking the location of the carriers 122 may be used, such as proximity sensors. All of the sensors 116 may interface with the computer 143 so that the location of each specimen container 102 may be known at all times.

Specimen testing apparatus 100 may be controlled by the computer 143, which may be a microprocessor-based central processing unit (CPU), having a suitable memory and suitable conditioning electronics, drivers, and software for carrying out the various computations and for operating the various components. Computer 143 may be housed as part of, or separate from, the base 120. The computer 143 may operate to control movement of the carriers 122 to and from the loading area 105, motion about the track 121, and motion to and from the centrifuge 125, motion to and from the characterization apparatus 130. Computer 143 may also control operation of the characterization apparatus 130. Computer 143 or a separate computer may control operation of the centrifuge 125, and motion to and from each analyzer 106, 108, and 110. In some embodiments, a separate integrated computer may control operation of each analyzer 106, 108, 110.

For all but the characterization apparatus 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the characterization apparatus 130 may also be provided by the computer 143, but according to methods described herein.

Embodiments may be implemented using a computer interface module (CIM) 145 that allows the user to readily access a variety of status and control display screens. These screens may describe some or all aspects of a plurality of interrelated automated devices used for preparation and analysis of specimens 212. The CIM 145 may be employed to provide information about the operational status of a plurality of interrelated automated devices, as well as information describing the location of any specimen 212 as well as a status of tests to be performed on, or being performed on, the specimen 212. The CIM 145 may thus be adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function buttons programmed to display functional aspects of the specimen testing apparatus 100.

Pre-screening the specimen 212 and quantification as described herein may ensure that the specimen 212 can be stopped from progressing to the one or more analyzers 106, 108, and 110 if there is insufficient amount of serum or plasma portion 212SP available to carry out the ordered tests. Advantageously also, the ability to accurately quantify the physical location of LA and SB or SG may minimize not only the possibility of aspirating air, but also minimize the possibility of aspirating either settled blood portion 212SB or gel separator 313 (if the gel separator 313 is present). Thus, clogging and contamination of the specimen aspirating pipette used to aspirate serum or plasma portion 212SP for the analyzers 106, 108, 110 or other station(s) may be avoided or minimized.

Now with reference to FIGS. 4A-4E, a description of a first embodiment of a characterization apparatus 130 including hyperspectral imaging is provided. Characterization apparatus 130 may be configured to automatically characterize and/or quantify the specimen 212 (e.g., the serum or plasma portion 212SP, the settled blood portion 212SB, or both) and/or may quantify geometrical features of the specimen container 102. The information obtained by the characterization apparatus 130 may also allow for identification of H, I, and/or L, and/or N of the specimen 212. Thus, using the characterization apparatus 130 may help avoid one or more of gripper crashes, pipette clogging, and air aspiration by the pipette, and identifying HI LN such that valuable analyzer resources are not wasted and that confidence in the test results may be improved.

Figure 4B:
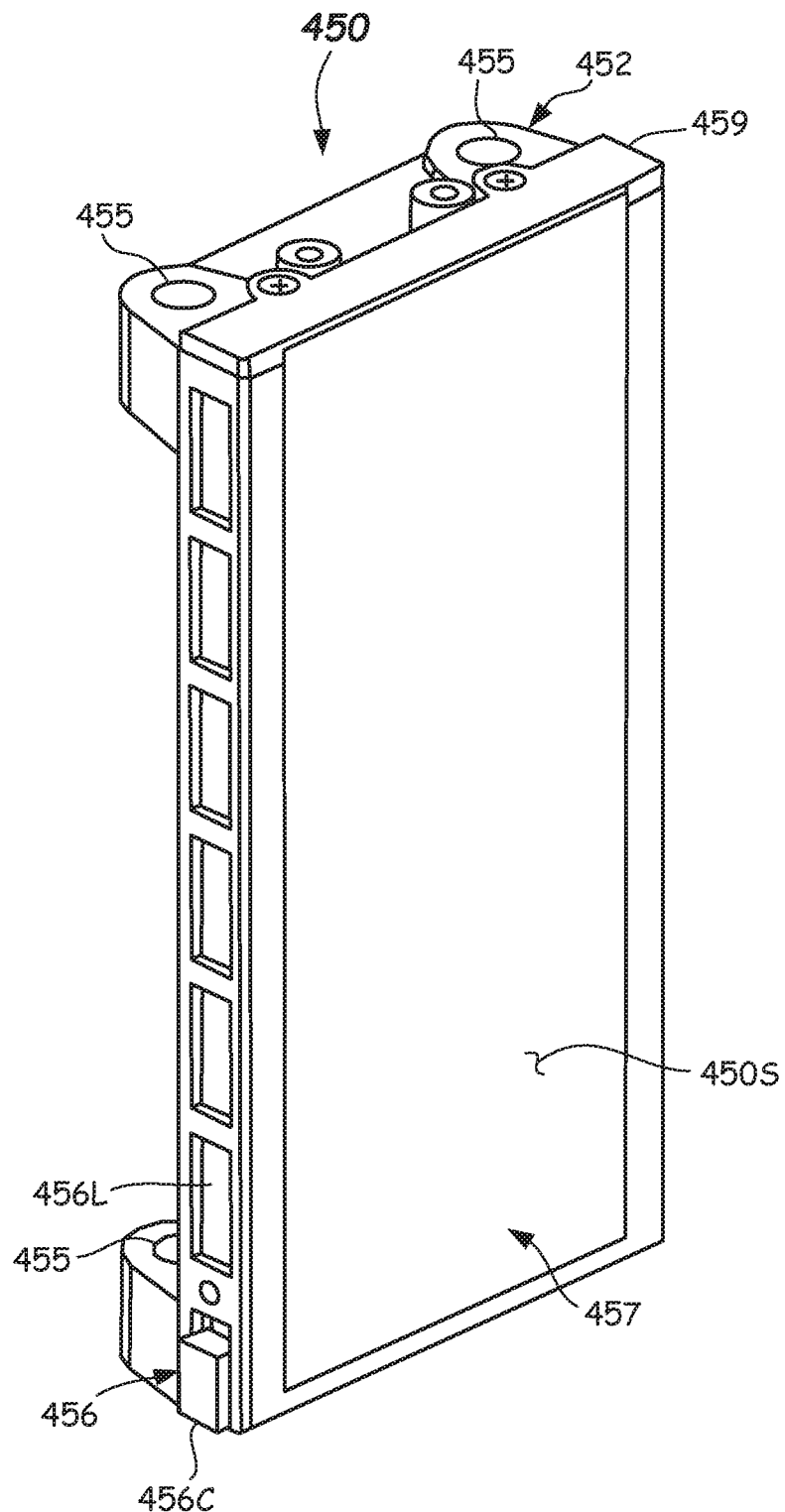
FIG. 4B illustrates an isometric view of a light panel assembly of the characterization apparatus of FIG. 4A according to one or more embodiments.
Figure 4C:
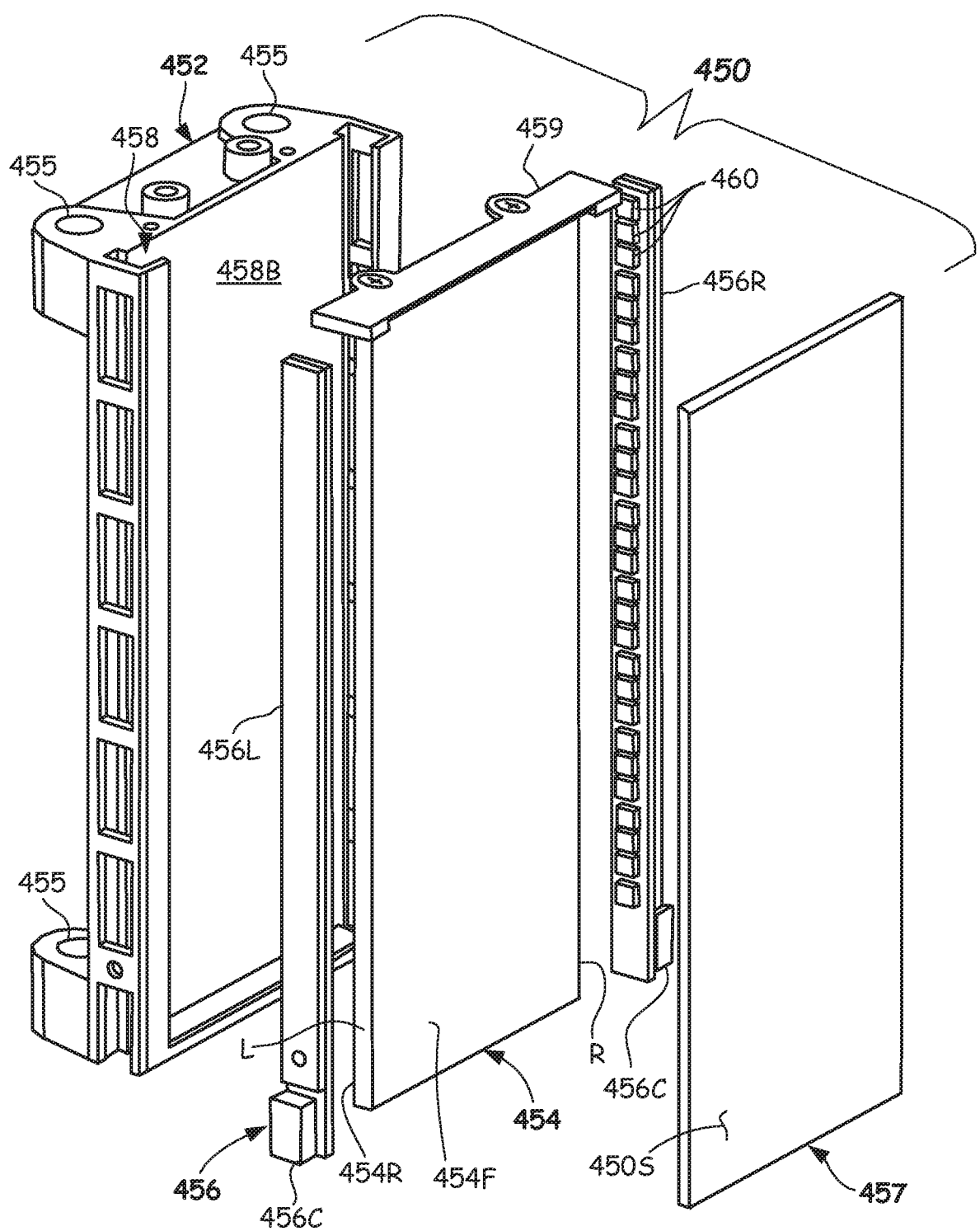
FIG. 4C illustrates an exploded isometric view of various components of a light panel assembly of FIG. 4B according to one or more embodiments.
Figure 4D:
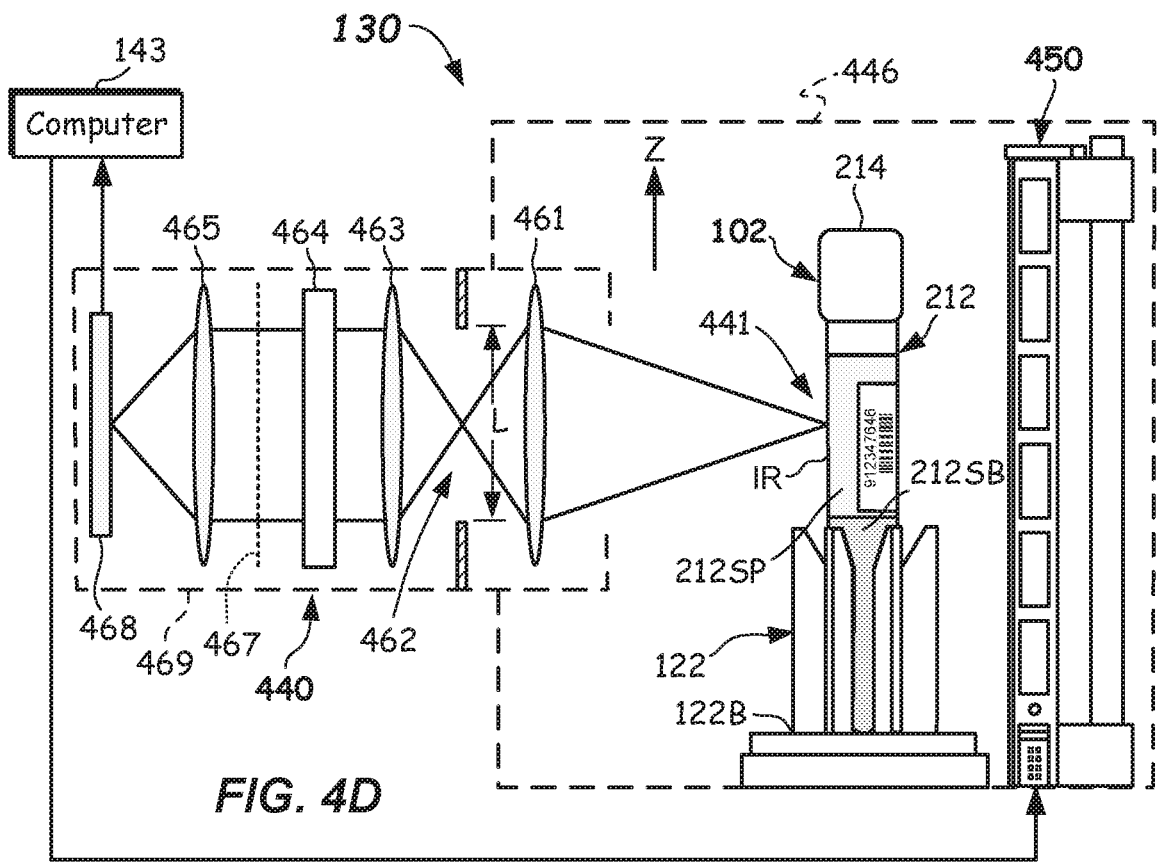
FIG. 4D illustrates a schematic side view (with enclosure shown dotted) of a characterization apparatus including hyperspectral transmittance imaging according to embodiments.
Figure 4E:
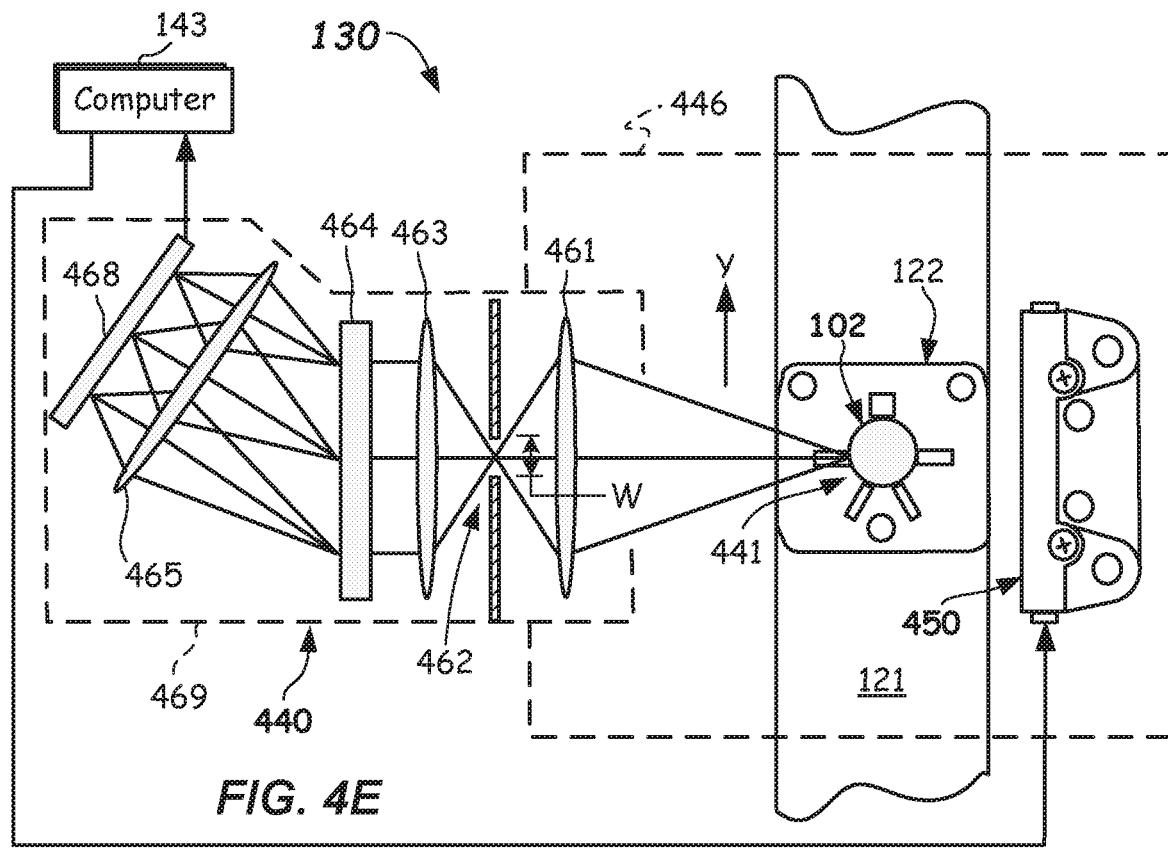
FIG. 4E illustrates a schematic top view (with enclosure shown dotted) of the characterization apparatus of FIG. 4D including hyperspectral transmittance imaging according to one or more embodiments.

Now referring to FIGS. 4A, 4D and 4E, a first embodiment of a characterization apparatus 130 including hyperspectral imaging is shown. Characterization apparatus 130 may include an imaging location 441 configured to receive a specimen container 102 containing a specimen 212, a light source 450 configured to provide lighting of the imaging location 441, and a hyperspectral image capture device 440 configured to generate and capture a spectrally-resolved image of a portion of the specimen container 102 and specimen 212 at the imaging location 441.

The light source 450 may be embodied as a light panel assembly including switchable light elements. In some embodiments, the light source 450 comprises a broad band light source. For example, the light source 450 may comprise one or more light panel assemblies, which may include a plurality of light sources. The light sources may collectively emit and provide a broadband light spectrum or a multi-band spectrum, wherein in the multi-band case, all of the light emissions from the multi-bands may be illuminated simultaneously.

In some embodiments, the broad band light source may provide a broadband emission anywhere in the range of 300 nm to 2000 nm. For example, in some embodiments, one or more white light sources having a light emission range between about 400 nm and 750 nm may be used. In others, a broadband light source emitting near infrared (NIR and/or mid-IR) may be used, for example, emitting spectral output in the range between about 750 nm and 2,000 nm, wherein NIR may be considered as a wavelength range of between about 750 nm to about 1200 nm, and mid-IR may be considered as a wavelength range of about 1200 nm to about 2,000 nm herein. In some embodiments, combinations of white light and NIR light emissions may be used. In some embodiments, a broadband spectral range of greater than 100 nm within the spectral range of 300 nm to 2,000 nm may be used.

Furthermore, in some embodiments, multi-bands having discreet wavelength ranges within the spectral range of 300 nm and 2,000 nm may be used. For example, the light source 450 may simultaneously illuminate at multiple different spectra within the range of 300 nm to 2,000 nm. For example, multiple different discreet lighting elements may be illuminated at a time. For example, lighting elements 460 may be different colored LEDs, such as red LEDs (R), green LEDs (G), and blue LEDs (B) that emit light spectra at different nominal wavelengths. The light source 450 may simultaneously emit red light at 634 nm +/− 35 nm, green at 537 nm +/−35 nm and blue at 455 nm +/−35 nm, for example. In particular, the light arrays 456L, 456R may include clusters of R, G & B LEDs as lighting elements 460 that may be repeatedly arranged along the height of the light arrays 456L, 456R, such as in order RGB, RGB, RGB, etc. High power Oslon SSL model LEDs available from Osram Opto Semiconductors GmbH of Regensburg, Germany may be used, for example. Each of the different-colored LEDs may be illuminated at once. For example, each or the R, G, and B LEDs as lighting elements 460 may be turned on simultaneously to provide multi-band illumination from the light source 450 to illuminate the specimen container 102 containing specimen 212 during imaging thereof. It should be recognized that R, G, and B are only examples, and that other combinations of discreet light elements may be simultaneously illuminated, such as any combination of R, G, B, UV, white light, NIR (wavelength range of about 750 nm to about 1,200 nm), and/or mid IR (wavelength range of about 1,200 nm to 2,000 nm), and the like in the spectral range of 300 nm to 2,000 nm.

Thus, one or more embodiments of light panel assembly may include at least two switchable lighting elements having different emission spectra. In some embodiments, switchable R, G and B lighting elements are provided. In some embodiments, switchable R, G, B, and white lighting elements are provided. In yet other embodiments, switchable R, G, B, and UV lighting elements are provided. In yet other embodiments, switchable R, G, B, and NIR or mid-IR lighting elements are provided. Any combination of two or more of switchable R, G, B, white light, UV, NIR, and mid-IR lighting elements may be provided in the light panel assembly. For NIR, an LED having a wavelength of 850 nm +/− 50 nm may be used in some embodiments. In such embodiments, the combination of switchable lighting elements may be provided in equal amounts and approximately evenly spaced along the height of the light guide 454.

Referring to FIGS. 4A-4C, the characterization apparatus 130 including hyperspectral imaging may include light source 450 as an active backdrop, as shown, i.e., that may be provided by the light panel assembly to provide back lighting. That is, the one or more light panel assemblies are located on a back side of the imaging location 441 opposite from the hyperspectral image capture device 440 and configured to provide back lighting of the specimen container 102 and specimen 212 at the imaging location 441.

The light source 450 may be embodied as a light panel assembly as shown in FIGS. 4A-4C, wherein each light panel assembly may include a frame 452, a light guide 454, and light assembly 456 configured to emit light into the light guide 454 and provide light emission from a front surface 450s of the light source 450. In the depicted embodiment, the light assembly 456 may emit light into the lateral edges L, R (e.g., the side edges) of the light guide 454, as best shown in FIG. 4C. The light source 450 may further include a diffuser 457, where one panel surface of the diffuser 457 may be the panel front surface 450S. Protective films may be used on or in conjunction with the diffuser 457.

The frame 452 may be made of a rigid material, such as plastic, and may include suitable fastening structures, such as bores 455 that are adapted to be mounted onto fixed mounting rods 455R (FIG. 4A). Other suitable mounting features may be included for mounting the light source 450 in a fixed orientation to the imaging location 441. Frame 452 may include a pocket 458 that may include an open front and top and a closed back surface 458B and bottom, as shown, and may be configured to receive and position the light assembly 456, the light guide 454, and the diffuser 457 (if used) therein. The light assembly 456, light guide 454, and diffuser 457 may be inserted into the pocket 458 from the top and secured in place with securement member 459. Other means for securing the light assembly 456, light guide 454, and the diffuser 457 in the frame 452 may be used.

The light guide 454 may be made of any suitably transparent light guide material including light diffusing capability, such as provided by a plastic sheet including internal light diffusing particles or other means of internal light diffusion. One suitable material is Acrylite LED® End-Lighten, a product available from Evonik Industries AG of Essen, Germany. The light guide 454 may be made of a sheet having a width of between about 60 mm and about 150 mm, a height of between about 120 mm and 180 mm, and a thickness of between about 3 mm and about 5 mm, for example. Other suitable sizes and thicknesses may be used.

In the depicted embodiment of FIGS. 4A-4C, the light guide 454 may function by guiding light emitted laterally into the lateral edges L, R thereof by light arrays 456L, 456R (LED strip modules) of the light assembly 456 through the bulk material of the light guide 454 and emitting light on the front face 454F and rear surface 454R of the light guide 454 due to light interactions with the light diffusing particles therein. In some embodiments, the rear surface 454R of the light guide 454 may include a highly-reflective material formed thereon to reflect or backscatter any light transmission passing towards the back surface 458B and direct it back into the bulk material of the light guide 454 so that it may then be emitted from the front face 454F. Optionally, a highly-reflective material may be provided on the back surface 458B of the frame 452, or as an individual element between the back surface 458B and the light guide 454. The highly-reflective material may be provided as a mirror or a white plastic element, or other plastic or glass element with a metallic coating of silver, gold, chrome, tin, or combinations, for example. The light emitted from the front face 454F may be radiated substantially uniformly across the entire surface of the light guide 454 and illuminates the specimen container 102 and specimen 212 at the imaging location 441.

The light arrays 456L, 456R may be LED strip modules including a linear array of individual light source elements (e.g., light emitting diodes—LEDs) arranged linearly along the lateral edges L, R of the light guide 454. The light arrays 456L, 456R each may include a plurality of LEDs, such as between about 8 and 80 LEDs, for example, that may be arranged on a circuit board with a connector 456C provided to allow electrical connection with and operation by, the computer 143. The light arrays 456L, 456R may be provided along the respective sides of the pocket 458 and are configured such that the emitting portion of each (e.g., LEDs) are provided directly adjacent to the lateral edges L, R and even touching the lateral edges L, R, if possible.

The light arrays 456L, 456R may be switchable, i.e., may be rapidly switched on and off to provide illumination of the imaging location 441. The switching of the lighting elements 460 may be accomplished by software operable on the computer 143 coupled with an appropriate power source and drivers. The switching of the lighting elements 460 may coincide with the image capture.

The optional diffuser 457 including diffusing properties and may be provided as a sheet of Acrylite® Satince available from EVONIK of Essen, Germany in some embodiments. The 0D010 DF colorless was found to work well. The diffuser 457 may be a sheet having height and width dimensions approximately the same as the light guide 454 and a thickness of between about 2 mm and about 4 mm, for example. Other dimensions may be used. The diffuser 457 may function by scattering light passing through it. The diffuser 457 and the light guide 454 may be provided in spaced relationship to one another with a slight gap formed there between. The gap may be, for example, between about 1 mm and about 5 mm, and about 2.4 mm in some embodiments. Other gaps may be used.

The characterization apparatus 130 may include a housing 446 (shown dotted) that may at least partially surround or cover the track 121 and the imaging location 441. The housing 446 may be a box-like structure provided to minimize outside lighting variances. Housing 446 may include one or more doors (not shown) to allow the carriers 122 to enter into and/or exit from the housing 446. In some embodiments, the ceiling may include an opening to allow a specimen container 102 to be loaded into a carrier 122 by a robot including a gripper adapted to grasp the specimen container 102.

Figure 5A:
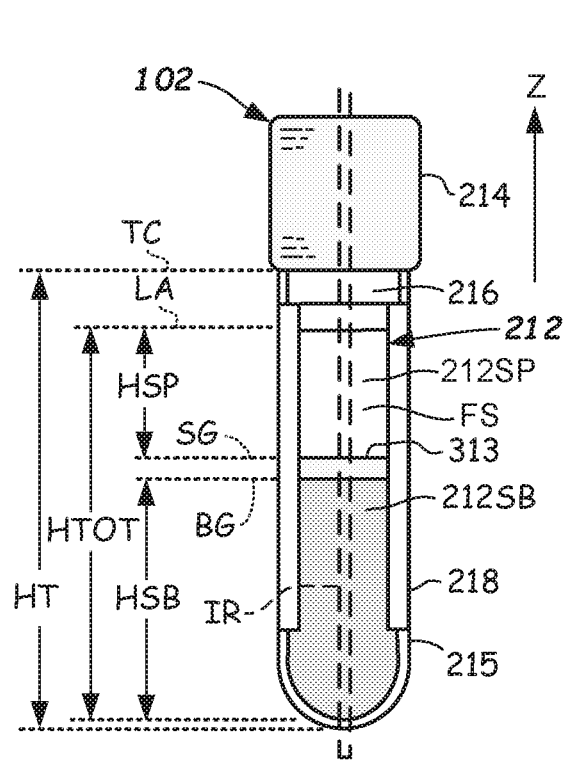
FIG. 5A illustrates a side plan view of a specimen container including a specimen and a gel separator and illustrating an example imaged region IR according to one or more embodiments.

The hyperspectral image capture device 440 will now be described in detail with reference to FIGS. 4D and 4E. Hyperspectral image capture device 440 may include a first lens 461, which is shown as a convex lens, including optical properties (e.g., focal length) configured to focus an image of a front surface FS (see also FIG. 5A) of the specimen container 102 and specimen 212 onto a plane of a slit aperture 462. The first lens 461 is shown as a single lens. However, other lens systems including combinations of more than one lens may be used to accomplish this function. Slit aperture 462 may be a slit-shaped opening in a wall structure having a wide dimension L as shown in FIG. 4D that is aligned with a length dimension of the specimen container 102, and a narrow dimension W as shown in FIG. 4E aligned with a width dimension across the specimen container 102, wherein the large dimension L is much greater than the narrow dimension W. By way of example, and not by limitation, the wide dimension L may be between about 5 mm and 20 mm, and the narrow dimension W may be between about 0.05 mm and 1 mm. Other slit dimensions may be used. The focal length of the first lens 461 may be between about 5 mm and 50 mm, for example. Other suitable focal lengths may be used. Thus, the light emerging from the slit aperture 462 is representative of only a small width region (an imaged region—IR) as shown in FIG. 5A. The size of the slit aperture 462 may be chosen so that it is sized to provide a suitable image of the regions of the specimen container 102 and specimen 212 of interest. For example, the width of the imaged region IR may be between about 1 mm and 5 mm and may be located at an approximate center of the width of the specimen container 102. The dimension of the width region is less than the overall width of the specimen container 102. Other suitable widths may be used. The length L of the imaged region IR may encompass only the serum or plasma portion 212SP in some embodiments, but in other embodiments may include some or all of the cap 214, some or all of the region including air 216, serum or plasma portion 212SP, and the settled blood portion 212SB. In other embodiments, the length L of the imaged region IR may include only the serum or plasma portion 212SP and the settled blood portion 212SB. The location of the serum or plasma portion 212SP may be determined by any suitable segmentation method.

Hyperspectral image capture device 440 may further include a lens system including a second lens 463 and a third lens 465, each of which may be concave lenses, wherein the second lens 463 may be located on a first side and the third lens 465 may be located on a second side of a spectrally-resolving element 464. The lens system including second lens 463 and third lens 465 is configured and operable to project an image of the plane of the slit aperture 462 onto a spectral image capture device 468. Thus, the second lens 463 operates to focus the light passing through the slit aperture 462 onto the spectrally-resolving element 464, and the third lens 465 focuses the dispersed spectral image onto the spectral image capture device 468. Any suitable lens or lens system may be used to accomplish these functions.

The spectrally-resolving element 464 is a device that spectrally disperses the incident light received thereat into a broader light spectrum, i.e., where the wavelength components (e.g., color or other components) making up the light spectrum are separated (like a rainbow) into continuous or discreet wavelengths.

The focal length of the second lens 463 may be between about 5 mm and 50 mm, for example. The focal length of the third lens 465 may be between about 5 mm and 50 mm, for example. Other focal lengths may be used.

The spectrally-resolving element 464 may be, for example, a prism, a diffraction grating, a spatially-varying filter, such as a linear band pass filter, or the like. A prism is a glass or other transparent object in prism form, especially one that is triangular with refracting surfaces at an acute angle with each other and that separates broadband light (e.g., separates white light into a spectrum of colors). A diffraction grating is an optical component with a periodic structure, which splits and diffracts light into several beams travelling in different directions. The diffraction grating may be transmissive or reflective. Other suitable devices for separating the light passing from the slit aperture 462 into its spectral components along the narrow dimension W may be used.

In the case of the prism, a right-angled or other suitable prism design may be used. The prism may include NBK-7 borosilicate glass, B270 crown glass, N-SF1 glass, or fused silica glass, or the like, for example. In the case of a spatially-varying filter, such as a linear band pass filter, certain regions of the filter will operate to transmit/pass only certain wavelength ranges. Thus, different physical regions of the filter may pass different wavelength ranges, so that the incident light on the filter is spatially resolved into numerous discreet wavelength bands which than are projected onto the spectral image capture device 468.

The spectral image capture device 468 may be any suitable detector capable of detecting light in the spectral wavelength range of interest, i.e., that can detect the spectrally-dispersed light. For example, the spectral image capture device 468 may be a photodetector, a charged coupled device (CCD), an array of photodetectors, array of phototransistors, array of photodiodes, one or more CMOS sensors, or the like. The resolution should be sufficient to match a predefined output spectral resolution. For example, the spectral image capture device 468 may include a resolution sufficient to produce spectral image size of about 640 pixels in the Z direction (corresponding to the wide dimension L of the slit aperture 462) and about 480 pixels in the Y direction (corresponding to the narrow dimension W of the slit aperture 462), for example. Other pixel densities and ratios of sizes in the L to Y dimensions may be used. In particular, a length of the spectral image capture device 468 in a direction associated with the L dimension may be greater than a width of the spectral image capture device 468 in a direction associated with the Y dimension. Further, the spectral image capture device 468 may have a spectral resolution of at least 100 pixels per inch in the Y dimension, and may have a spectral resolution of at least 100 pixels per inch in the L dimension. The length of the spectral image capture device 468 may be between 1 mm and 30 mm, for example. Other sizes may be used.

The spectral image capture device 468 communicates the captured image data of the spectrally-resolved image to the computer 143, which is configured and operable to process the data of the spectrally-resolved image received at the spectral image capture device 468 and determine at least one of: segmentation of the specimen and/or specimen container, and determination of a presence or absence of an interferent in the serum or plasma portion 212SP of the specimen 212 (e.g., a fractionated specimen).

Figure 5B:
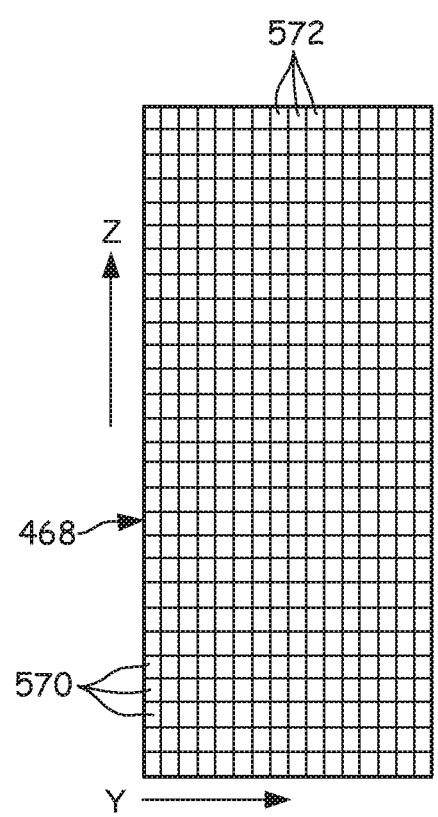
FIG. 5B illustrates a front plan view of a spectral image capture device showing the imaging units thereon according to one or more embodiments.

An example of a spectral image capture device 468 is shown in FIG. 5B and may include a resolution of about 640 pixel units associated with the Z (height) dimension of the specimen container 102, and a resolution of about 480 pixel units associated with the Y dimension, which is the spectral dimension. Other numbers of units are possible, depending upon the degree of in the measurement accuracy that is sought. Calibration of the vertical Z dimension may be accomplished depending on the optics and the amount of spread of the image in the Z direction. In any event, if needed, calibration will enable direct correlation between the vision system and the actual physical coordinate location along the specimen container 102 in the Z dimension.

Hyperspectral image capture device 440 may include an enclosure 469 configured to house and support the various components thereof, such as the first lens, 461, aperture assembly including slit aperture 462, second lens 463, third lens 465, spectrally-resolving element 464, and spectral image capture device 468 in a suitable orientation so that an image of the specimen container 102 and specimen 212 is from a single lateral viewpoint, as shown. FIG. 4D includes a coordinate break 467 to allow the third lens 465 and spectral image capture device 468 to be shown in parallel to the other components for clarity.

The imaging location 441 is a location in the housing 446 including an expected location of the specimen container 102. In some embodiments, the specimen container 102 may be placed at or stopped at the imaging location 441, such as by stopping the carrier 122 on the track 121 or otherwise placing the specimen container at the imaging location 441 by a robot (or even manually), so that it is approximately located in a center of the image window of the hyperspectral image capture device 440.

FIGS. 5A, 5B and FIGS. 6A and 6B will be used to illustrate the processing of the spectral image data received at the spectral image capture device 468. The image focused onto the spectral image capture device 468 is a spectrally-resolved image in the Y dimension, yet still correlated spatially to the height of the specimen container 102 in the Z dimension (see FIG. 5B). The imaged region IR (FIG. 5A), may be a small portion of the width of the specimen container 102, such as approximately at or near the center thereof, but which is less than the full width of the specimen container 102. The imaged region IR extends along at least a portion of the height (Z dimension) of the specimen container 102, and even extending slightly above the cap 214 and/or below the bottom of the tube 215 in some embodiments. At each vertical location, correlated with each row of image units 570 along the Z dimension, the image is spectrally resolved in the Y dimension into the range of spectral interest. Thus, some or all of the spectral units 572 in the Y dimension each receive thereat a different small spectral portion of the overall range or ranges of spectra received at the spectral image capture device 468. The spectral portion received at each spectral unit 572 depends on the resolution of the spectral image capture device 468 in the Y dimension and also on whether the light source is broadband or multi-band. The spectral resolution may be between about 100 pixel units and 1000 pixel units over the width in the Y dimension and/or over the height in the Z dimension, for example. Other spectral resolutions may be used.

The spectral range of interest may be the same as the emitted spectra of the light source 450 in some embodiments, and therefore may be between about 300 nm and 2,000 nm. However, in some embodiments where white light is used, the emitted spectral range and thus the spectral range of interest may be between about 400 nm and 750 nm. The extent of the Z dimension used for computation depends on the results of segmentation. The segmentation process may be accomplished using the output of the hyperspectral image capture device 440, or optionally by some other segmentation method. For example, in some embodiments, the segmentation may be performed using another method, such as is taught in U.S. Pat. No. 9,322,761, for example. Once segmentation is completed, the extent of the Z dimension used for computation can be determined. In particular, the data associated with regions other that the serum or plasma portion 212SP in the Z dimension may be ignored for the interferent determination (e.g., for determining HILN). Thus, the portion of the imaged region IR above and below the serum or plasma portion 212SP may be unused.

At each vertical Z location associated with image units 570, spectral data from spectral units 572 over the resolved spectral range received by the spectral image capture device 468 may be provided to the computer 143, wherein each spectral unit 572 along the Y dimension (width) of the spectral image capture device 468 that receives light corresponds to a small portion of the spectral range received at the spectral image capture device 468.

Figure 6A:
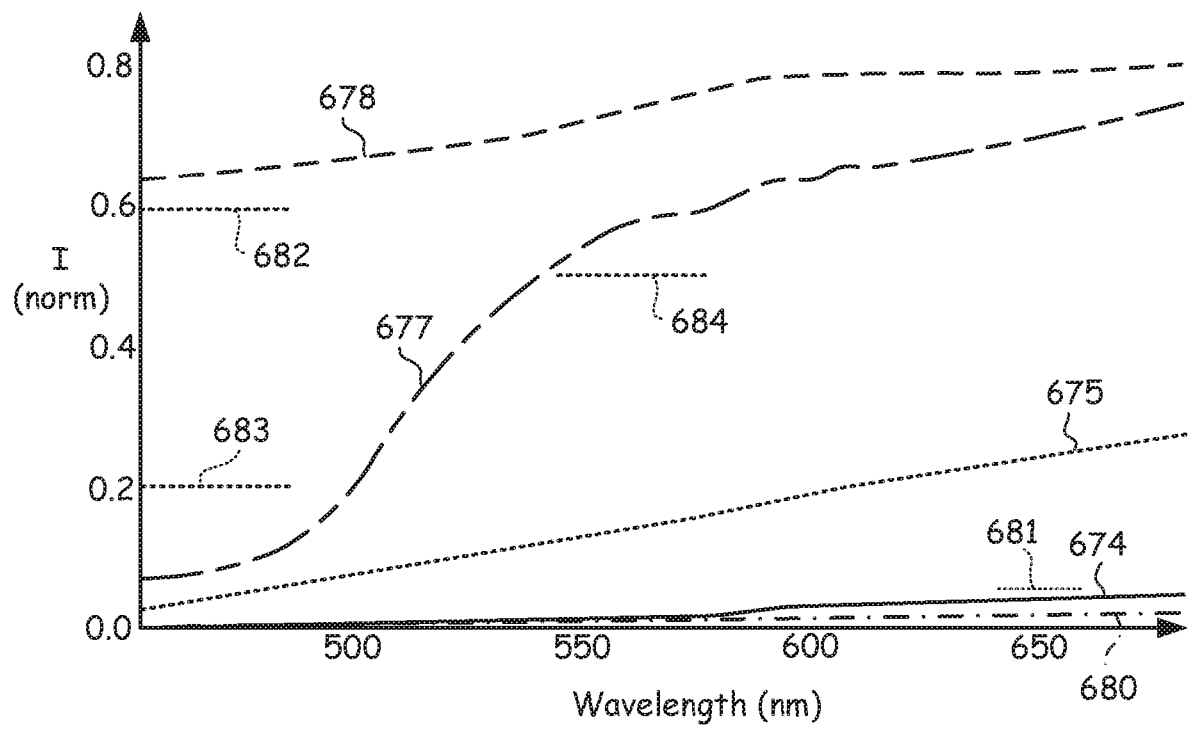
FIG. 6A illustrates a graphical plot of normalized intensity I (norm) versus wavelength $\lambda$ for various portions of the specimen container and specimen according to one or more embodiments.

A representative spectral plot for various materials from the characterization apparatus 130 including hyperspectral image capture device 440 and back lighting with light source 450 is shown in FIG. 6A. The plot includes representative approximated blood spectral data signatures 674 for settled blood portion 212SB, gel separator spectral data 675, normal spectral data 677 if a serum or plasma portion 212SP that is normal N, air spectral data 678, and cap spectral data 680. Thus, for each of the image units 570 in the Z dimension a representative intensity data plot of normalized intensity I (norm) versus each wavelength λ over the resolved spectral range may be obtained. Thus, for each image, a large amount of spectral information is captured. The captured image data represents intensity I (norm) measured by the spectral image capture device 468 at each wavelength λ, which then may be normalized to 1.0. This data provides intensity responses over the wavelength spectra of interest for the material that is located at that associated Z dimension.

A similar data set may be generated for each respective vertical row of the image units 570. Thus, a plurality of subsets of data, which may be in the form of a data matrix, may be obtained of intensity versus wavelength λ for some or all of the image units 570. As discussed above, each subset of data may contain a spectral signature (e.g., data like in plot of FIG. 6A) wherein each is indicative of a particular class of material associated with that vertical Z location. Thus, processing the data with computer 143 to identify the representative signature may, in one or more embodiments, be used to provide segmentation. Segmentation as defined herein is the use of the data of the spectrally-resolved image to determine the respective classes of material of at least the specimen 212, and possibly also the specimen container 102 along the vertical Z dimension.

The segmentation of the specimen container 102 and/or the specimen 212 may be accomplished by analyzing the various spectral signatures as a function of the Z dimension by any suitable analysis method. For example, the classification can be based, in one embodiment, on a set of expert-based rules. The expert-based rules may be based upon wavelength filters to process and examine only a certain frequency range or ranges, threshold limits, extrema (e.g., minima and/or maxima), or ranges within those frequency range or ranges that are indicative of certain material spectral signatures. One or more slopes or other characteristics may also be used as an expert rule.

Figure 6B:
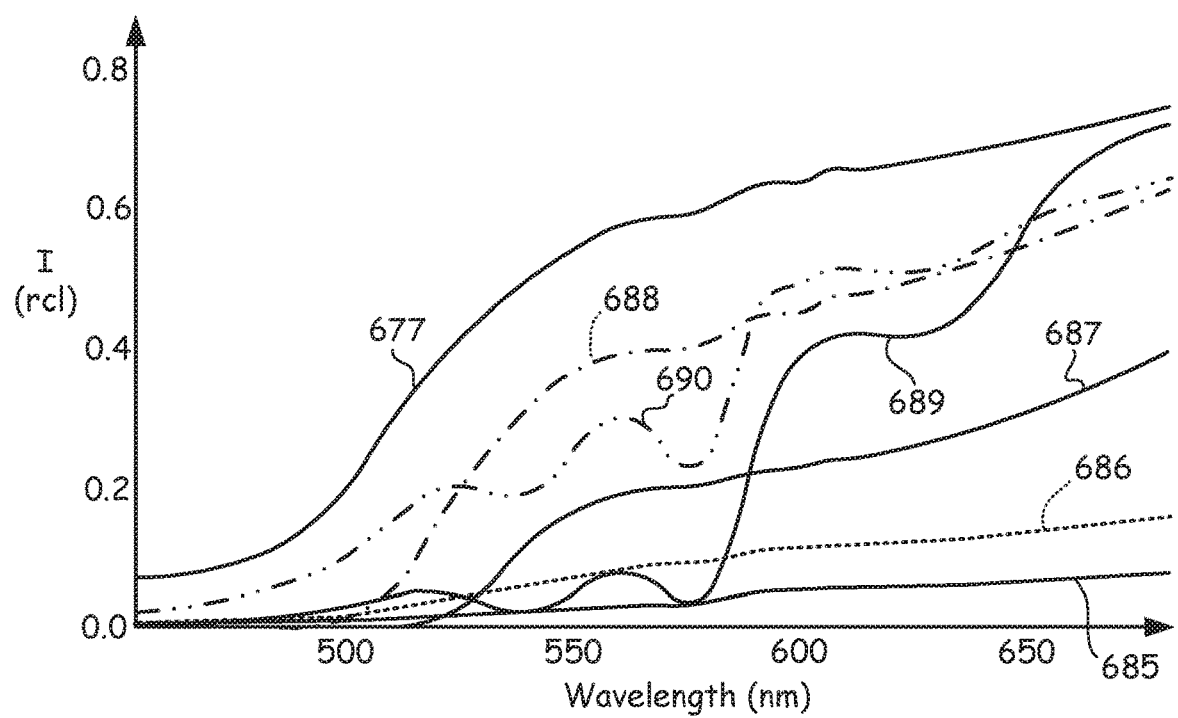
FIG. 6B illustrates a graphical plot of normalized intensity I (norm) versus wavelength $\lambda$ for various HIL conditions of the specimen according to one or more embodiments.

For example, during a segmentation analysis, the imaged region IR in the wide Z dimension may be chosen to have a length L sufficient to encompass a full height of a tallest specimen container 102 that is expected to be received at the imaging location 441. Referring again to FIG. 6A, the spectral signatures may be analyzed along image units 570, from the top down. The cap 214 would first be encountered, which could be recognized by its very low transmittance. For example, the spectral signature of cap spectral data 680 of the cap 214 may be analyzed at 650 nm and if the intensity is less than an intensity threshold 681, then cap 214 would be determined by the expert-based rule. Moving downward in the captured spectral data along image units 570, the next element encountered would be air (air as seen through the specimen container 215) including air spectral signature of air spectral data 678 that is representative of the class of air 216, which may be discriminated by comparing the signature at 450 nm against an air threshold minimum 682, for example. If above the air threshold minimum 682, then that image unit 570 would be determined to be air 216. Next, the liquid-air interface LA would be expected. Thus, a change to the associated spectral signature as shown in FIG. 6A or 6B illustrating various HILN conditions may be present. Normality N may be determined by identifying the spectral signature of normal spectral data 677 representative of being normal N, by using any form of expert rule. For example, dual liquid thresholds could be used at 450 nm and 550 nm, for example. Thus, a determination of normality N can be made for the particular image unit 570 in the vertical Z direction if a maximum liquid threshold 683 was not exceeded at 450 nm, while also a minimum threshold 684 is exceeded at 550 nm.

Other suitable expert rules may be used, including examining the location of local extrema (minima and/or maxima) in the spectrum or one or more slopes of the spectral signature at one or more wavelengths or between wavelengths. Next expected is either gel separator 313 or settled blood portion 212SB. Again expert rules can be used to determine these classes, as well. For example, an abrupt change in signature can be expected going from serum or plasma portion 212SP to settled blood portion 212SB, because of the very low transmittance of the settled blood portion 212SB. Thus, one or more thresholds on either slope and/or Intensity I (norm) may be used. The bottom most part of the specimen container 102 may be known based upon previous machine space calibration or machine space-image space calibration thereby knowing the exact location of the bottom register 122B (See FIG. 4D) of the receptacle receiving the specimen container 102 in the carrier 122. Discrimination of gel separator 675 may be determined based on a slope or combination of slope or intensity threshold(s), for example. Other types of expert rules may be used for segmentation by analyzing the spectral data at each image unit 570 and subset thereof.

Other means for segmentation using the spectral image data may include using a model-based approach, wherein the various spectral data for some or all of the respective image locations in image units 570 and spectral units 572 may be feed as an input to a model, which then produces segmentation thereof. For example, in one embodiment, the segmentation may be carried out using an appropriately trained neural network as described herein.

Figure 7:
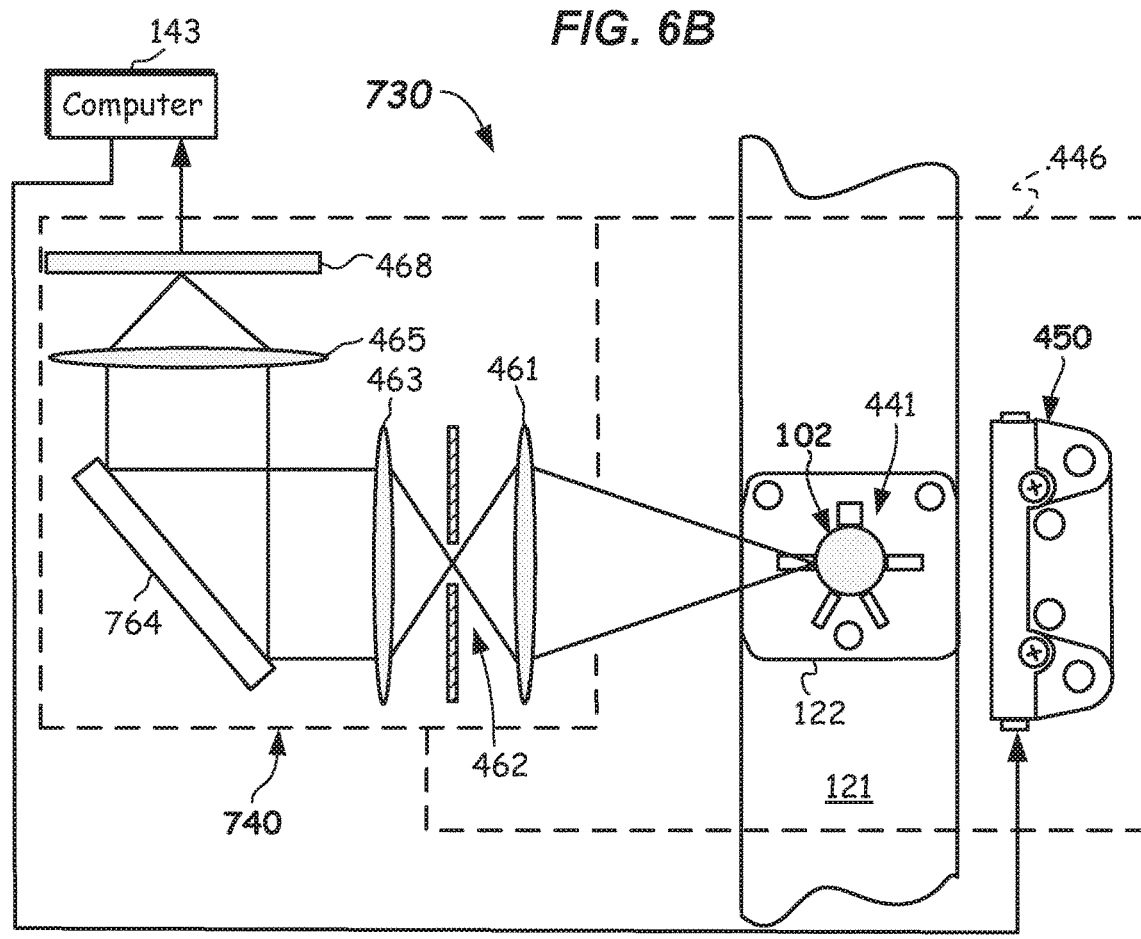
FIG. 7 illustrates a top view schematic diagram (with enclosure shown dotted) of another characterization apparatus including hyperspectral reflective imaging according to one or more embodiments.

Another embodiment of characterization apparatus 730 including a light source 450 configured to provide back lighting and hyperspectral image capture device 740 is shown and described with reference to FIG. 7. Characterization apparatus 730 is similar to the embodiment of FIGS. 4A and 4B, except that the spectrally-resolving element 764 is a diffraction grating and is embodied in a reflective configuration whereas the FIG. 4A-4B embodiment is embodied as a transmissive configuration. The processing of the image data received at the spectral image capture device 468 may be the same as described herein. In this case where the spectrally-resolving element 764 is a diffraction grating, wherein separation into spectral components is by means of diffraction.

The light source 450 may be constructed as previously described, and the LEDs or other suitable lighting elements 460 arranged along the height of the light guide 454 may be broadband light sources such as white light LEDs or other white light emitting elements, or multi-band light elements (e.g., R, G, B). The slit aperture 462 may be as previously described.

Figure 8A:
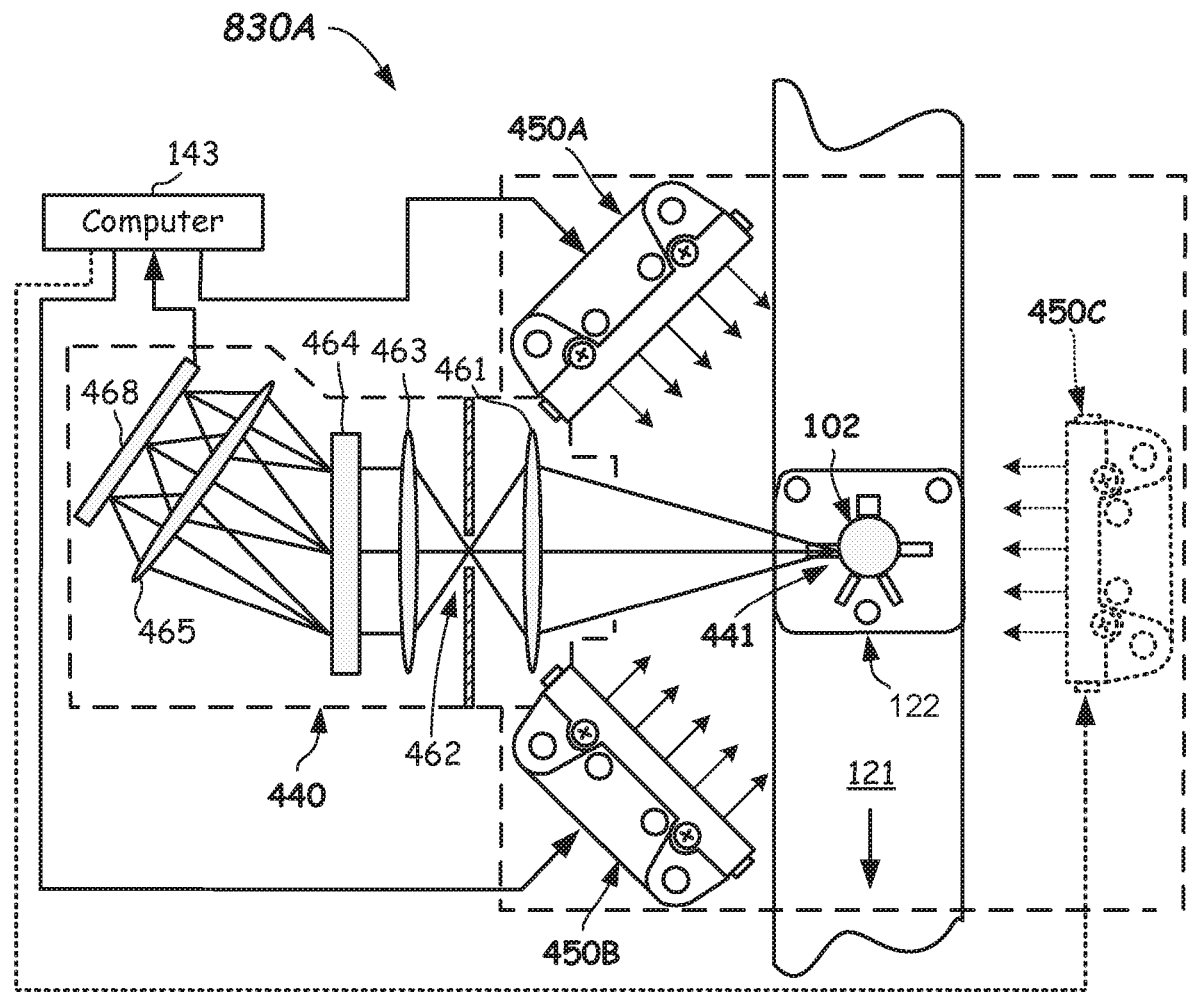
FIG. 8A illustrates a top view schematic diagram (with enclosure shown dotted) of another characterization apparatus including hyperspectral reflective imaging and/or transmissive imaging according to one or more embodiments.
Figure 8B:
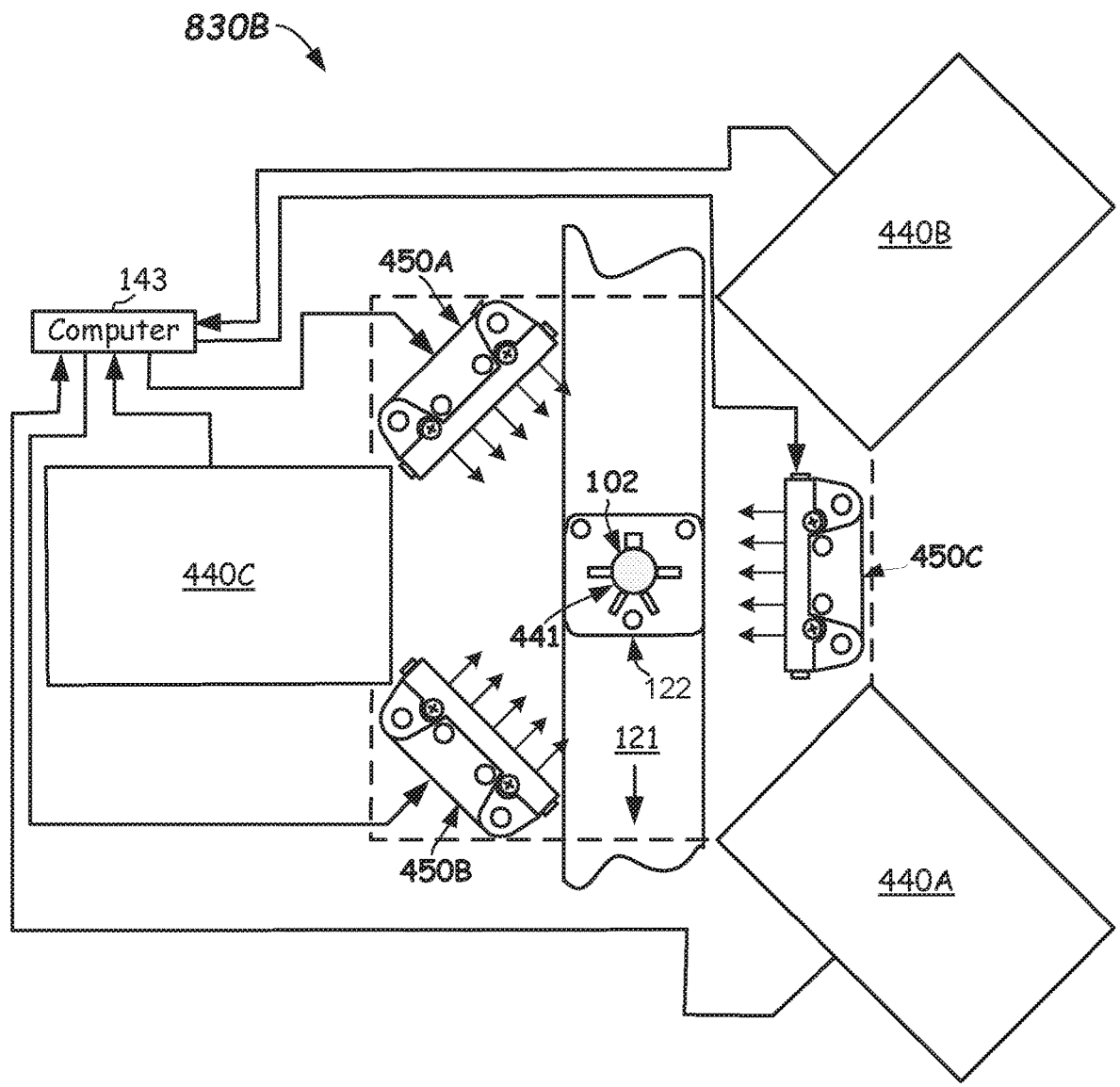
FIG. 8B illustrates a top view schematic diagram (with enclosure shown dotted) of another characterization apparatus including multiple hyperspectral transmissive image capture devices according to one or more embodiments.

Another embodiment of characterization apparatus 830A similar to characterization apparatus 130 is illustrated in FIG. 8. Characterization apparatus 830A includes multiple ones of light sources 450A, 450B configured to provide illumination by front lighting of the imaging location 441, and a hyperspectral image capture device 440 as previously described. The processing of the image data received at the spectral image capture device 468 may be as described herein. The spectral content for some of the components may be slightly different for the front side illumination case. However, processing may be accomplished by expert-based rules, or model-based methods configured to recognize or test for certain features of the spectral data. In an alternate embodiment, another light source 450C may be included in the characterizing apparatus 830A so that transmissive imaging may be provided in combination with front lighted imaging.

FIG. 8A illustrates yet another embodiment of a characterization apparatus 830B including hyperspectral imaging that may include multiple ones of the hyperspectral image capture devices 430A-C and multiple ones of the light source 450A, 450B, 450C arranged around the imaging location 441. Three hyperspectral image capture devices 430A-430C are shown equally spaced, but more than three could be used. This configuration of characterization apparatus 830B maximizes the possibility that if the label 218 may be located on the front side in one viewpoint so as to occlude view of the serum or plasma portion 212SP, there may be an open viewing window to image the serum or plasma portion 212SP on at least one other lateral viewpoint, where the serum or plasma portion 212SP is fully visible or occluded only on a backside. Each hyperspectral image capture device 430A-C may include the configuration taught in any of the embodiments described herein, such as shown in FIG. 4A, 4B, and FIG. 7.

Figure 9:
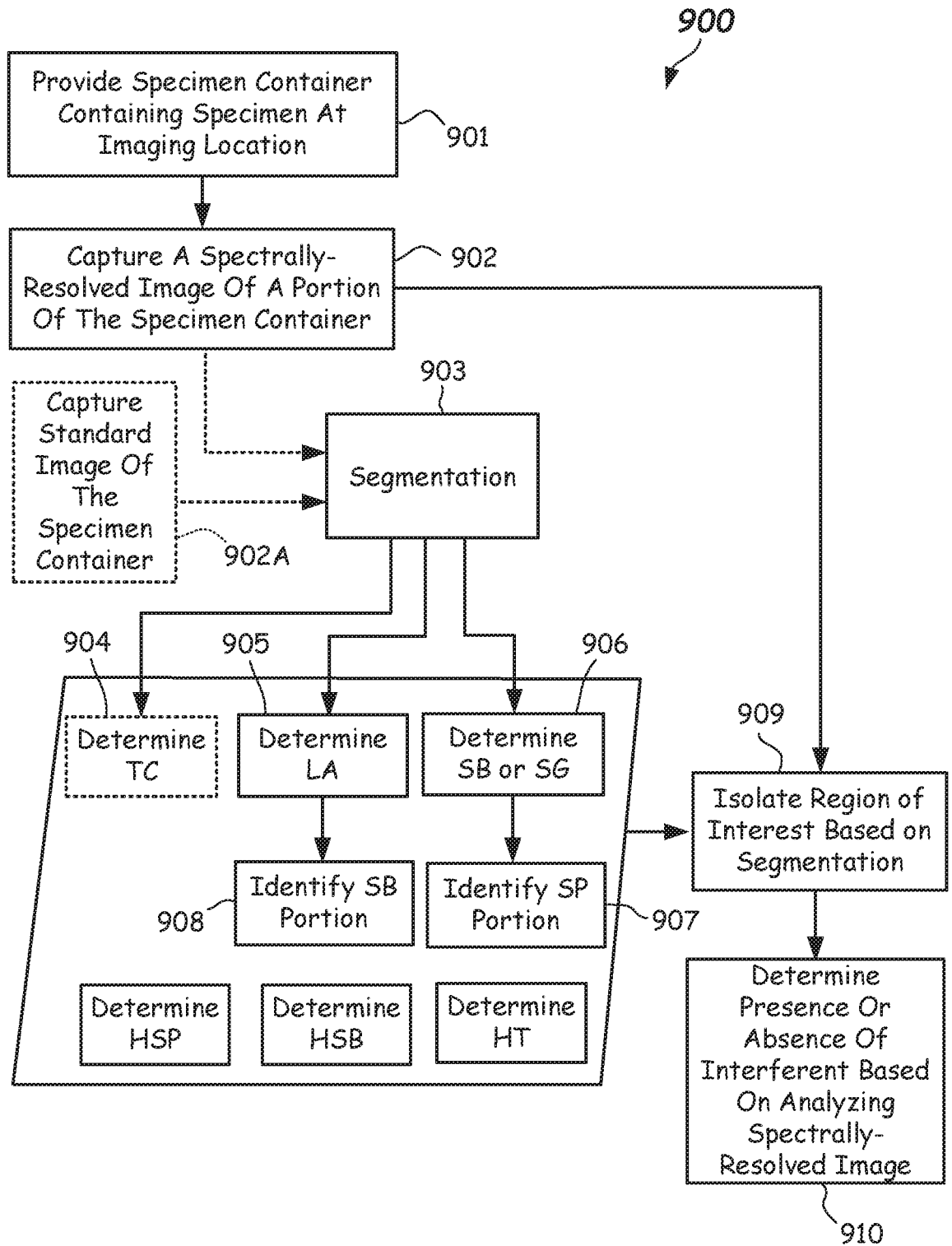
FIG. 9 illustrates a schematic diagram of functional components of a characterization apparatus including hyperspectral imaging according to embodiments.

In accordance with another aspect, any of the characterization apparatus described herein (e.g., characterization apparatus 130, 730, 830A, 830B) may be used to determine an interferent, such as HIL, in the serum or plasma portion 212SP, following the segmentation process to determine the vertical location of the serum or plasma portion 212SP of the specimen 212. As shown in FIG. 9, which represents a schematic diagram 900 of the functional components of the characterization apparatus 130, 730, 830A, 830B, in block 901, a specimen container 102 containing the specimen 212 (e.g., fractionated specimen) is provided at the imaging location 441. The specimen container 102 containing the specimen 212 may be supported in an upright orientation in the carrier 122 as shown in FIG. 4A, for example. The carrier 122 may be configured to travel on a track 121 of a specimen testing apparatus 100 as shown in FIG. 1.

In block 902, a spectrally-resolved image of a portion (e.g., the imaged region IR—see FIG. 5A) of the specimen container 102 containing specimen 212 is captured by the spectral image capture device 468. Optionally, in block 902A a non-spectral image of the specimen container 102 containing specimen 212 may be captured in addition to the spectrally-resolved image in 902. The image data from either one of these can be used to accomplish segmentation of the specimen 212 and/or specimen container 102, or both in segmentation block 903. In particular, the goal of the segmentation in segmentation block 903 is to determine the vertical location of the serum or plasma portion 212SP in block 907. In particular, the segmentation in segmentation block 903 may determine, as an optional output, the tube-cap interface TC in block 904. This may be used to determine a height of the specimen container 102. Segmentation in segmentation block 903 may also determine as an output, the liquid-air interface LA in block 905, and may determine the serum-blood interface SB or the serum-gel interface SG in block 906. Once segmentation in segmentation block 903 is completed, the region of interest can be isolated in block 909, which may be to isolate any further analysis to only the serum or plasma portion 212SP, as the upper and lower boundaries thereof are now known.

In block 910, the presence or absence of an interferent can be determined based on analyzing the spectrally-resolved image data obtained in block 902. In particular, the interferent may be one or more of H, I, and L. Now referring to FIG. 6B, example spectral signatures of two levels of each of H, I, L and of N in the serum or plasma portion 212SP are provided. For example, high lipemic spectral data 685 indicative of a high level of lipemia L having relatively-low level of transmittance, and low lipemic spectral data 686 indicating a relatively-lower level of lipemia L (shown dotted) and having a relatively-higher level of transmittance are shown in FIG. 6B. Likewise, high icteric spectral data 687 indicating a relatively-high level of icterus I having a relatively-low level of transmittance, and low icteric spectral data 688 indicating a relatively-lower level of icterus I (shown dotted) and having a relatively-higher level of transmittance are shown in FIG. 6B. Furthermore, low hemolytic spectral data 689 indicating a relatively-high level of hemolysis H and having relatively-low level of transmittance, and high hemolytic spectral data 690 indicating a relatively-lower level of hemolysis H (shown dotted) and having a relatively-higher level of transmittance are shown in FIG. 6B. The spectral plot of the normal spectral data 677 of a specimen 212 that is normal N is also shown in FIG. 6B.

Some of the spectral signatures can be may be identified using expert rules, as described above, such as whether the specimen 212 is normal N. Likewise, the presence of lipemia L may be determined using expert rules. For example, for some levels of lipemia one or more thresholds based on Intensity I (norm) and/or slope(s) and/or local extrema (minima, maxima) at one or more wavelengths λ may be used.

In other embodiments, the determination of H, I, and/or L in block 910 may be accomplished by analyzing the spectral signatures by means of a suitable machine learning method. The machine learning method may include a training phase where a sufficient number of annotated samples (e.g., hundreds or even thousands) of different configurations and levels of H, I, and L are evaluated in the characterization apparatus 130, 730, 830A, 830A and are provided to form the classifier.

The annotation may involve graphically outlining various regions in a multitude of examples of specimen containers 102 having various specimen conditions, which is provided in a learning phase to form the classifier, along with the spectral information obtained from testing the example specimens. The classifier may be trained by annotating specimen conditions such as locations of air 216, areas occluded by label 218, locations of serum or plasma portion 212SP, locations of settled blood portion 212SB, locations of gel separator 313 (if included), and information about the type and level of interferent present, such as H, I, L and N.

The number of levels of example specimens containing HIL may be provided in as many increments as is wanted from the classifier as an output. Thus, examples including different configurations of label 218 on the back side or even on the front side, different levels of serum or plasma portion 212SP, different levels of settled blood portion 212SB, different locations of gel separator 313, and different index levels of HIL may be provided as training inputs along with the spectral matrices for each containing the Intensity I (norm) versus wavelength information as a function of the Z dimension obtained by testing in the characterization apparatus 130, 730, 830A, 830B. Areas of the holder 122H may be ignored, as well as areas having barcode provided thereon.

For example, the machine learning analysis may include a neural network based approach wherein the data of the spectrally-resolved portion of the specimen container 102 comprising the serum or plasma portion 212SP determined by the previous segmentation in 903 may be provided as a data matrix input to the neural network to classify the type of interferent present, such as H, I, and/or L or if the specimen 212 is normal N. The neural network may also output an index (a level) associated with one or more of H, I, and/or L. The input to the neural network may comprise intensity or transmittance information as a function of wavelength $\lambda$ for each of the units 570 associated with the serum or plasma portion 212SP input as a data matrix for each specimen 212 tested.

In each of the characterization apparatus 130, 730, 830A, 830B described herein, the image capture may be triggered and captured responsive to a triggering signal sent by computer 143 and provided in communication lines when the computer 143 receives a signal that the carrier 122 is located at the imaging location 441. A single image may be captured and that image is very informationally dense, including the spectral content information at each image unit 570.

Figure 10:
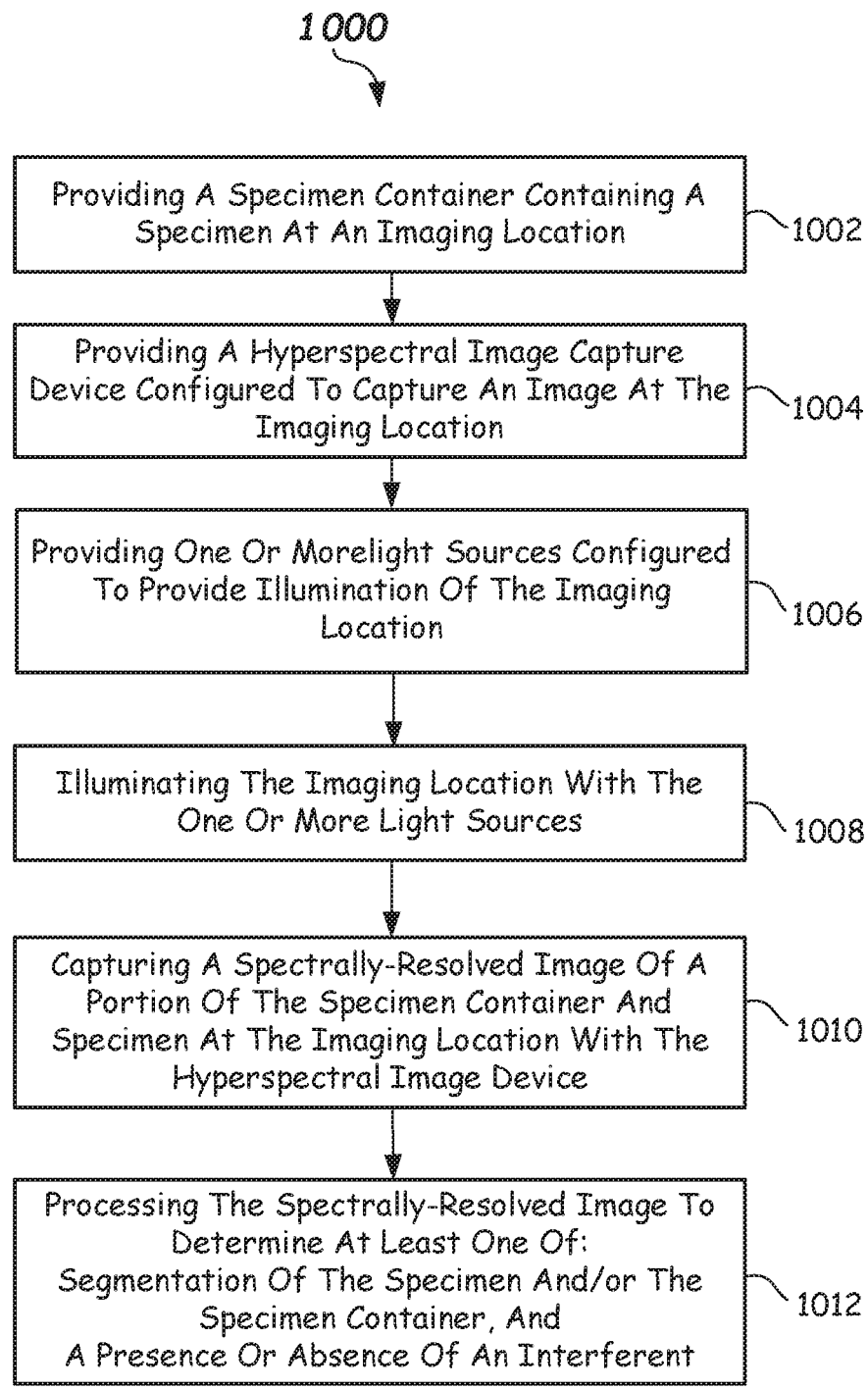
FIG. 10 is flowchart of a method of a method of characterizing a specimen container and/or a specimen using hyperspectral imaging specimen according to one or more embodiments.

FIG. 10 illustrates a flowchart of a method of characterizing a specimen container 102 and/or a specimen 212. The method 1000 includes, in 1002, providing a specimen container (e.g., specimen container 102, such as a capped blood collection tube) containing a specimen (e.g., specimen 212) at an imaging location (e.g., imaging location 441). Imaging location 441 may be inside of a characterization apparatus 130, 730, 830A, 830B). The specimen container (e.g., specimen container 102) may be placed at the imaging location (e.g., imaging location 441) by being transported thereto on a track (e.g., track 121), by being placed there by a robot (e.g., robot 124 or the like), or manually.

The method 1000 includes, in 1004, providing a hyperspectral image capture device (e.g., hyperspectral image capture device 440, 740) that is configured to capture an image at the imaging location (e.g., imaging location 441). The method 1000 includes, in 1006, providing one or more light sources (e.g., light panel assemblies 450, 450A, 450B) configured to provide illumination of the imaging location 441. The illumination may be provided by back lighting as shown in FIG. 4A-4B or as front lighting as shown in FIG. 8A, or combinations thereof. The illumination may be provided as broadband illumination, and may include one or more subranges in the range of between about 300 nm and 2,000 nm. In some embodiments, multiple sources may be used in combination (e.g., white light, NIR, and/or mid-IR). In one embodiment, the illumination may be provided by a white light source (e.g., 400 nm-750 nm). Other broadband spectral lighting ranges spanning at least 100 nm may be used. Further multi-band light sources may be used.

The method 1000 includes, in 1010, capturing the spectrally-resolved image of a portion (e.g., the imaged region—IR) of the specimen container 102 and specimen 212 with the hyperspectral image capture device, and, in 1012, processing the spectrally-resolved image to determine at least one of: segmentation of the specimen and/or the specimen container, and a presence or absence of an interferent, such as HIL. The imaged region IR may be a small region having a width in the Y dimension that is a small fraction of the overall width of the specimen container 102. Moreover, the length L of the imaged region IR may encompass at least the serum and plasma portion 212SP and at least some of the settled blood portion.

While the characterization apparatus 130 has been shown in FIG. 1 as being located such that the pre-screening characterization is performed immediately after centrifugation, it may be advantageous to include this pre-screening for HILN using the characterization apparatus (e.g., characterization apparatus 130, 730, 830A, 830B) directly on an analyzer (e.g., analyzer 106, 108, and/or 110), or elsewhere in the specimen testing apparatus 100. Furthermore, in some embodiments, the centrifugation may be performed prior to loading the racks 104 into the loading area 105, so that the characterization apparatus 130, 730, 830A, 830B may be located at the loading area 105 and the pre-screening can be carried out as soon a specimen container 102 is loaded into a carrier 122.

While the disclosure is susceptible to various modifications and alternative forms, specific system and apparatus embodiments and methods thereof have been shown by way of example in the drawings and are described in detail herein. It should be understood, however, that it is not intended to limit the invention to the particular apparatus, systems, or methods disclosed but, to the contrary, the intention is to cover all modifications, equivalents, and alternatives falling within the scope of the claims.

What is claimed is:

1. A characterization apparatus, comprising:
an imaging location configured to receive a specimen container containing a specimen;
a light source configured to provide lighting of the imaging location;
a hyperspectral image capture device comprising a spectral image capture device, the hyperspectral image capture device configured to generate and capture a spectrally-resolved image of a portion of the specimen container and specimen at the spectral image capture device; and
a computer configured and operable to process the spectrally-resolved image received at the spectral image capture device and determine at least one of:
segmentation of the specimen,
segmentation of the specimen container and the specimen, and
a presence or absence of an interferent.

2. The characterization apparatus of claim 1, wherein the light source comprises a broad band light source of at least 100 nm bandwidth within a range of between 300 nm and 2,000 nm.

3. The characterization apparatus of claim 1, wherein the light source comprises multiple spectral bands having discreet wavelength ranges within a range of between 300 nm and 2,000 nm.

4. The characterization apparatus of claim 1, wherein the light source comprises one or more light panel assemblies including a plurality of white light sources.

5. The characterization apparatus of claim 1, wherein the light source comprises one or more light panel assemblies including a combination of a white light source and a near infrared source or a mid-infrared source.

6. The characterization apparatus of claim 5, wherein each one of the one or more light panel assemblies comprise:
   a mounting frame,
   a light guide; and
   a plurality of light elements are configured to emit light into the light guide and provide broadband or multi-band light emission from a front surface.

7. The characterization apparatus of claim 5, wherein the one or more light panel assemblies are located on a back side of the imaging location opposite from the hyperspectral image capture device and is configured to provide back lighting of the specimen container and specimen.

8. The characterization apparatus of claim 5, wherein the one or more light panel assemblies are located on a front side of the imaging location on a same side as the hyperspectral image capture device and is configured to provide front lighting of the specimen container and specimen.

9. The characterization apparatus of claim 1, wherein the hyperspectral image capture device comprises a lens and slit aperture assembly configured to project an image of the portion of the specimen container and specimen onto a spectrally-resolving element.

10. The characterization apparatus of claim 9, wherein spectrally-resolving element comprises a prism.

11. The characterization apparatus of claim 9, wherein spectrally-resolving element comprises a diffraction grating.

12. The characterization apparatus of claim 9, wherein spectrally-resolving element comprises a linear band pass filter.

13. The characterization apparatus of claim 1, wherein the hyperspectral image capture device comprises a spectral image capture device configured to capture the spectrally-resolved image wherein a length of the spectral image capture device in a direction associated with a wide dimension of a slit aperture of the hyperspectral image capture device is greater than a width of the spectral image capture device in a direction associated with a narrow dimension of the slit aperture.

14. The characterization apparatus of claim 1, wherein the hyperspectral image capture device comprises a spectral image capture device configured to capture the spectrally-resolved image, the spectral image capture device comprises a spectral resolution of at least 100 pixels in a Y dimension and a Z dimension, wherein the Y dimension is a spectral dimension, and the Z dimension is a spatial dimension.

15. The characterization apparatus of claim 1, wherein the hyperspectral image capture device comprises:
   a slit aperture in a wall structure having a wide dimension L aligned with a height dimension of the specimen container, and a narrow dimension W aligned with a width dimension across the specimen container, wherein L>W.

16. The characterization apparatus of claim 15, wherein the hyperspectral image capture device comprises:
   a lens and the slit aperture assembly configured to project an image of an imaged region of the specimen container and specimen onto a spectrally-resolving element.

17. The characterization apparatus of claim 1, wherein the hyperspectral image capture device comprises:
   a slit aperture in a wall structure having a wide dimension L aligned with a height of the specimen container, and a narrow dimension W aligned with a width dimension across the specimen container, wherein L>W;
   a first lens including a focal length configured to focus an image of a first surface of the specimen container and specimen onto a plane of the slit aperture;
   a spectrally-resolving element;
   a spectral image capture device; and
   a lens system including a second lens and a third lens, wherein the third lens and spectrally-resolving element are configured to project the spectrally-resolved image of the portion of the specimen container and specimen onto the spectral image capture device.

18. The characterization apparatus of claim 1, wherein the computer is configured to determine one or more of:
   hemolysis,
   icterus,
   lipemia, and
   normality the specimen, based upon the spectrally-resolved image.

19. The characterization apparatus of claim 1, wherein the computer is configured to determine segmentation of at least one of the specimen and the specimen container based upon the spectrally-resolved image.

20. The characterization apparatus of claim 19, wherein segmentation of the least one of the specimen and the specimen container includes determining a vertical location of one or more of:
   a serum or plasma portion in the specimen;
   a settled blood portion of the specimen;
   a gel separator; and
   air in the specimen container; and
   a cap.

21. The characterization apparatus of claim 20, wherein segmentation of the specimen includes determining a vertical location of one or more of:
   a tube-cap interface,
   a liquid-air interface,
   a serum-blood interface,
   a serum-gel interface, and
   a blood-gel interface.

22. A specimen testing apparatus, comprising:
   a track;
   a carrier moveable on the track and configured to support a specimen container containing a specimen; and
   a characterization apparatus located on the track, the characterization apparatus comprising:
      an imaging location configured to receive the specimen container containing the specimen carried by the carrier,
      a light source configured to provide lighting of the imaging location,
      a hyperspectral image capture device including a spectral image capture device configured to generate and capture a spectrally-resolved image of a portion of the specimen container and specimen at the imaging location, and
      a computer configured and operable to process the spectrally-resolved image received at the spectral image capture device and determine at least one of:
         segmentation of the specimen,
         segmentation of the specimen container and the specimen, and
         a presence or absence of an interferent.

23. A method of characterizing a specimen container and/or a specimen, comprising:
   providing the specimen container containing the specimen at an imaging location;

providing a hyperspectral image capture device configured to capture an image at the imaging location;
providing one or more light sources configured to provide illumination of the imaging location;
illuminating the imaging location with the one or more light sources;
capturing a spectrally-resolved image of a portion of the specimen container and specimen with the hyperspectral image capture device; and
processing the spectrally-resolved image to determine at least one of:
  segmentation of the specimen,
  segmentation of the specimen container and the specimen, and
  a presence or absence of an interferent.

* * * * *